(12) United States Patent
Hoseinitabatabaei et al.

(10) Patent No.: US 10,257,678 B2
(45) Date of Patent: Apr. 9, 2019

(54) SCALABLE DATA DISCOVERY IN AN INTERNET OF THINGS (IOT) SYSTEM

(71) Applicant: Convida Wireless, LLC, Wilmington, DE (US)

(72) Inventors: Seyed Amir Hoseinitabatabaei, Surrey (GB); Payam Barnaghi, London (GB); Lijun Dong, San Diego, CA (US); Chonggang Wang, Princeton, NJ (US); Rahim Tafazolli, Surrey (GB)

(73) Assignee: Convida Wireless, LLC, Wilmington, DE (US)

( * ) Notice: Subject to any disclaimer, the term of this patent is extended or adjusted under 35 U.S.C. 154(b) by 11 days.

(21) Appl. No.: 15/311,694

(22) PCT Filed: May 20, 2015

(86) PCT No.: PCT/US2015/031744
§ 371 (c)(1),
(2) Date: Nov. 16, 2016

(87) PCT Pub. No.: WO2015/179499
PCT Pub. Date: Nov. 26, 2015

(65) Prior Publication Data
US 2017/0094592 A1 Mar. 30, 2017

Related U.S. Application Data

(60) Provisional application No. 62/000,796, filed on May 20, 2014.

(51) Int. Cl.
*H04W 4/70* (2018.01)
*H04W 48/16* (2009.01)
(Continued)

(52) U.S. Cl.
CPC ............ *H04W 4/70* (2018.02); *G06N 99/005* (2013.01); *H04W 48/16* (2013.01); *H04W 84/18* (2013.01)

(58) Field of Classification Search
CPC .............. H04L 47/2433; H04L 47/12; H04W 28/0268; H04W 28/0289; H04W 48/16; H04W 4/005; H04W 84/18
See application file for complete search history.

(56) References Cited

U.S. PATENT DOCUMENTS

| | | | | |
|---|---|---|---|---|
| 9,008,329 | B1* | 4/2015 | Mandel | G10K 15/00 381/71.1 |
| 2013/0346504 | A1* | 12/2013 | Huang | H04L 12/185 709/204 |
| 2015/0131434 | A1* | 5/2015 | Lee | H04L 47/2433 370/230 |

OTHER PUBLICATIONS

Barnaghi et al, "A Linked-data Model for Semantic Sensor Streams", IEEE International conference on Internet of Things (ithings2013), Beijing, China 2013, 8 pages.
(Continued)

*Primary Examiner* — Redentor Pasia
*Assistant Examiner* — Peter K Mak
(74) *Attorney, Agent, or Firm* — BakerHostetler

(57) ABSTRACT

Data discovery for sensor data in an M2M network uses probabilistic models, such as Gaussian Mixing Models (GMMs) to represent attributes of the sensor data. The parameters of the probabilistic models can be provided to a discovery server (DS) that respond to queries concerning the sensor data. Since the parameters are compressed compared to the attributes of the sensor data itself, this can simplify the distribution of discovery data. A hierarchical arrangement of discovery servers can also be used with multiple levels of discovery servers where higher level discovery servers using more generic probabilistic models.

18 Claims, 16 Drawing Sheets

(51) Int. Cl.
*G06N 99/00* (2010.01)
*H04W 84/18* (2009.01)

(56) References Cited

OTHER PUBLICATIONS

Barnaghi et al, "Semantics for the Internet of Things: Early Progress and Back to the Future", Int. J. Semant. Web Inf. Syst., 2012, vol. 8, 1-21.
Compton et al, "The SSN Ontology of the W3C Semantic Sensor Network Incubator Group", Web Semantics: Science, Services and Agnets on the World Wide Web, 17, Dec. 31, 2012, 25-32.
De et al, "An Internet of Things Platform for Real-World and Digital Objects", Scalable Computing: Practice and Experience, Jan. 31, 2012, 13(1), 45-57.
Evans, D., "The Internet of Things How the Next Evolution of the Internet Is Changing Everything", Cisco Internet Business Solutions Group (IBSG), White Paper, Apr. 2011, 11 pages.
Evdokimov et al, "Comparison of Discovery Service Architectures for the Internet of Things", 2010 IEEE International Conference on Sensor Networks, Ubiquitous, and Trustworthy Computing, Jun. 2010, 237-244.
Ganz et al, "Context-Aware Management for Sensor Networks", Presented at the Proceedings of the 5th International Conference on Communication System Software and Middleware, Verona, Italy, 2011, Jul. 2011, 1-6.
IBM What is big data? Bringing big data to the enterprise—India, Jan. 2012, 2 pages, https://www-01.ibm.com/software/in/data/bigdata/.
International Patent Application No. PCT/US2015/031744: International Search Report and the Written Opinion dated Oct. 2, 2015, 11 pages.
Jirka et al, "Discovery Mechanisms for the Sensor Web", Open Access, Apr. 16, 2009, 9(4), 2661-2681.
Le-Phuoc et al, "The Linked Sensor Middleware—Connecting the real world and the SemanticWeb", Digital Enterprise Research Institute—National University Ireland Galway, Ireland, Oct. 2011, 1-8.
Lu, C and Hu, Z., "A Fault-Tolerant Routing Algorithm of P2P Network based on Hierarchical Structure", In e-Business and Information System Security (EBISS), 2010 2nd International Conference on May 22, 2010, 1-4 pages.
Niu et al, "A Survey of Outlier Detection Methodologies and Their Applications", in Artificial Intelligence and Computational Intelligence, 7002, Springer-Verlag Berlin Heidelberg Sep. 2011, 380-387.
Paganelli, F. and Parlanti, D., "A DHT-Based Discovery Service for the Internet of Things", Journal of Computer Networks and Communications, Hindawi Publishing Corporation, vol. 2012, Oct. 16, 2012, 1-11 pages.
Ramabhadran et al, "Prefix Hash Tree an Indexing Data Structure over Distributed Hash Tables", In Proceedings of the 23rd ACM Symposium on Principles of Distributed Computing, Jul. 2004, vol. 37, 1-10 pages.
Ranasinghe et al, "Unique Radio Inovation for the $21^{st}$ Century", Springer Heidelberg Dordrecht London New York, © Springer-Verlag Berlin Heidelberg Feb. 2010, 2011, 203-227.
Schoenemann et al, "P2P Architecture for Ubiquitous Supply Chain Systems", Presented at the $17^{th}$ European Conference on Information Systems, Verona, Italy, 2009, 12 pages.
Sheth et al, "Semantic Sensor Web", IEEE Internet Computing, 2008, 12(4), 78-83.
Shi et al, "SecDS: A Secure EPC Discovery Service System in EPCglobal Network", Proceedings of the second ACM Conference on Data and Application Decurity and Privacy, 2012, Feb. 7, 2012, 267-274.
Smys et al, "Self-Organizing Hierarchical Structure for Wireless Networks", 2010 International Conference on Advances in Computer Engineering, 2010, IEEE Computer Society, 268-270.
Sugiyama, M., "Density Ratio Estimation in Machine Learning", Cambridge University Press, Sep. 7, 2012, 1-94 pages.
Tran et al, "PODS: A New Model and Processing Algorithms for Uncertain Data Streams", Proceedings of the 2010 International Conference on Management of DataSigmod 2010, Jan. 31, 2010, 1-12 pages.
Yick et al, "Wireless Sensor Network Survey", Computer Networks, 52, Aug. 2008, 2292-2330.
Yu et al, "Issues in Designing Middleware for Wirleess Sensor Networks", IEEE, 18, Jan. 2004, 15-21.
Zhang et al, "An Algorithm for Estimating Number of Components of Gaussian Mixture Model Based on Penalized Distance", IEEE Int. Conference Neural Networks & Signal Processing Zhenjiang, China, Jun. 8-10, 2008, 482-487.

* cited by examiner

```
<rdf:Description
rdf:about="zc9y363b85cgfe118fad69978b7262c70ff06dc208dfaa
4284fe565145a483c38a909230098e">
<wot:type>http://dbpedia.org/resource/Position_sensor</wot:type>
<wot:location>zc9y363b85cg</wot:location>
<wot:time>1360768014343<wot:time>
<wot:value>6</<wot:value>
<xs:datatype>xsd:double</xs:datatype>
<wot:unit>http://sweet.jpl.nasa.gov/ontology/units.owl#degreeC<wot:unit>
</rdf:Description>
```

1. GET query
2. SET DS=DSL3
3. initial_path=FINDPATH(query, DS)
4. result=SERACH(initial_path.gateway/query)
5. IF(result==null)
6.   Exclude initial_path.gateway
7.   result=SEARCHDSL1(initial_path.DSL1, query)
8. END
9. IF(result==null)
10.   Exclude initial_path.DSL1
11.   result=SEARCHDSL2(initial_path.DSL2, query)
12. END
13. IF(result==null)
14.   Exclude initial_path.DSL2
15.   result=SEARCHDSL3(initial_path.DSL3, query)
16. END SEARCHDSL1 (DSL1, query)
1. SORT DSL1.gateways
2. For (GTW: DSL1.gateways)
3.   result = SEARCH(GTW.query)
4.   IF(result==null) BREAK END
5. END SEARCHDSL2 (DSL2, query)
1. SORT DSL2.DSL1s
2. For (DSL1: DSL2.DSL1s)
3.   result = SEARCHL1(DSL1, query)
4.   IF(result==null) BREAK END
5. END SEARCHDSL3 (DSL3, query)
1. SORT DSL3.DSL2s
2. For (DSL2: DSL3.DSL2s)
3.   result = SEARCHDSL2(DSL2, query)
4.   IF(result==null) BREAK END
5. END

FIG. 6

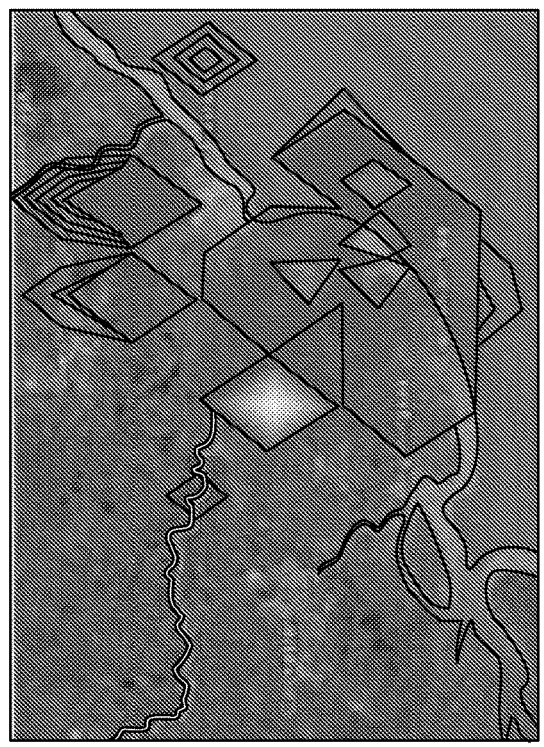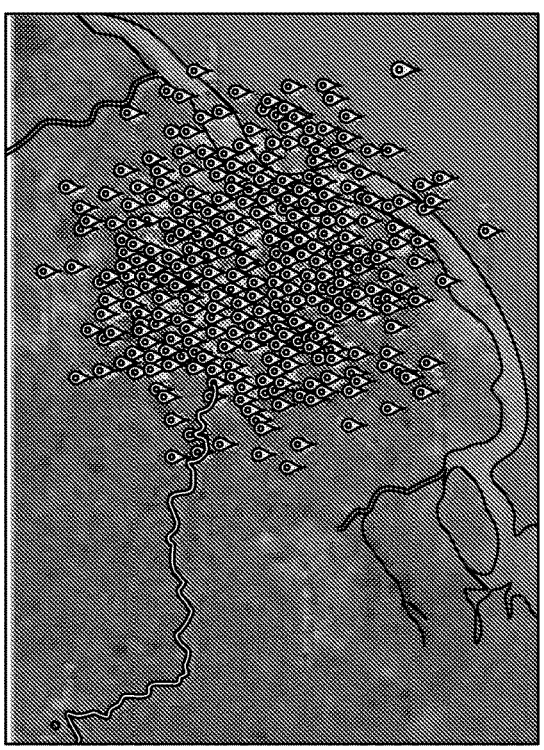
FIG. 7

SCALABLE DATA DISCOVERY IN AN INTERNET OF THINGS (IOT) SYSTEM

CROSS-REFERENCE TO RELATED APPLICATIONS

This application is the National Stage of International Application No. PCT/US2015/031744 filed May 20, 2015, which claims the benefit of U.S. Provisional application No. 62/000,796, filed May 20, 2014, the disclosures of which are incorporated herein by reference in their entireties

BACKGROUND

It is estimated that by 2020 there will be more than 50 billion Internet connected devices. These devices will include sensory devices that can observe and measure physical world phenomena and report or generate information about the real world entities (i.e. "Things"). The collected data can be simple types such as temperature, humidity, light or composite and complex information such as detecting an event or combination of different data to measure and report pollution level at a specific location. Extension of the current Internet, integrating real world data and providing autonomous or user-mediated interactions with the real world objects over the Internet is often described under the umbrella term of the "Internet of Things" (IoT).

IoT data is provided by RFID, sensor nodes or other network-enabled devices (or is submitted directly by human users via social media and/or smart devices—i.e. Citizen Sensing). IoT data can be described as numerical measurement data or syntactical description of events and observations from the real world. The data can be provided as raw values or it can include enhanced meta-data and semantic descriptions that represent different attributes of the data. The IoT data can be stored on the nodes and devices; it is generally perceived that the IoT data is to be cached/stored at the edge of the access networks (i.e. in gateways and often stored for short-term). Some of the key attributes that are essential for search and discovery and processing of the IoT data in large and distributed environments, where various sources can share and publish data from different locations and/or are related to different phenomena, are thematic (e.g. type, unit), spatial (e.g. geo-location), temporal (e.g. time stamps) and quality (e.g. accuracy) related attributes. Different data description models are constructed to enhance the semantic description and to enable providing machine-interpretable representations for the IoT data. FIG. 1 shows a semantically annotated description of sample temperature data. The semantic annotation of the data is provided using the Resource Description Framework (RDF) representation. Some of the key works in this area are described in the W3C Semantic Sensor Network (SSN) Ontology and a model provided in P. Barnaghi, W. Wang, C. Henson, and K. Taylor, "*Semantics for the Internet of Things: Early Progress and Back to the Future,*" Int. J. Semant. Web Inf. Syst., vol. 8, pp. 1-21, 2012.

FIG. 2 reflects an exemplary Machine to Machine (M2M) architecture view and presents a holistic overview of the key components that are typically involved in data collection, dissemination and discovery in the IoT systems. The data can be stored for longer-term in Information Repositories (IRs) 104. The indexing process and storing the references to the data that are stored in network or in short-term/long-term repositories are provided in the Discovery Servers (alternately called "Directory Servers") (DSs) 106. DSs 106 also maintain the data search and discovery functions and allow the clients (i.e. data consumers) to query the data across distributed networks. The discovery process, if successful, will redirect the query 108 to the gateway 102 or IRs 104 that contains information about the queried data or it will directly fetch the data from the source and will return it to the client. However, the attributes of the IoT data are often dynamic (e.g. their location, quality and availability can change over time) and this will make the index information subject to frequent updates. When the volume of the IoT data (or resources) is considered, maintaining the indices at DSs 106 will generate a considerable traffic load over the network.

S. Evdokimov, B. Fabian, S. Kunz, and N. Schoenemann, "*Comparison of Discovery Service Architectures for the Internet of Things,*" 2010 IEEE International Conference on Sensor Networks, Ubiquitous, and Trustworthy Computing, pp. 237-244, 2010 surveys some of the important state-of-the-art approaches for discovery services. The study assumes that the IoT data would be presented by some numerical identification i.e. Object ID (OID). Information about the objects is stored at distributed Information Services (IS) which are similar to the information repositories 104 shown in FIG. 2. Discovery services process the client's query for a specific OID and provide a link to the IS which is expected to provide the requested information. Various architectures are then proposed to organize the DSs overlay network in order to resolve the ISs in distributed manner. These approaches share similar problems regarding management of the data indices. In following we first explain the EPC global approach as an example and then describe the indexing problem with respect to this example.

EPCglobal is a common standard for RFID data management and sharing infrastructures. The architecture of the EPCglobal is made up of various entities including the EPC discovery services (or EPCDS) which have a similar role to DSs 106 shown in FIG. 2, EPC information services (EPCIS), and naming services. Once EPCISs receive information about a new EPC they publish it at the EPCDS. The clients can query the EPCDS to get information about the events associated with a given OID. EPCDS provides a link to EPCISs that have published information about a given OID. The clients can then use the provided link to query the EPCIS for detailed information about the given OID.

Similar to EPCglobal the other works described in Evdokimove's survey, follow the same concept for publishing the indices to the DSs but instead of a centralized approach they use a network of Discovery Service Providers to scale the query processing into a global form. For example, the Bridge project utilizes Lightweight Directory Access Protocol (LDAP) and N. Schonemann, K. Fischbach, and D. Schoder, "*P2P architecture for ubiquitous supply chain systems,*" presented at the 17th European Conference on Information Systems, Verona, Italy, 2009 considers a peer to peer architecture.

The main shortcoming of EPCglobal and other similar approaches lies in the management of the indices across ISs and DSs. In case of EPCglobal, indexing high volumes of EPCs at DSs and performing the queries over all data entries is clearly computationally intensive and does not comply with the scale of the IoT data resources. Apart from query processing, insertion and removal of the data entries can generate a significant traffic load between ISs and DSs. Finally these approaches are limited to the situations at which the actual OID is queried. Although such assumptions are valid for most of the applications that are envisioned for RFIDs applications, they cannot fulfil the requirements for other IoT data resources such as sensors and actuators where the dynamic attributes of the data, instead of the static identifier of the resource, is often the subject of query.

F. Paganelli and D. Parlanti, "*A DHT-Based Discovery Service for the Internet of Things*," Journal of Computer Networks and Communications, vol. 2012, p. 11, 2012. has proposed a new distributed service discovery mechanism for IoT which expands the preceding architectures by proposing a mechanism to support flexible identification scheme and using multidimensional attribute and range queries. The multidimensional attributes are first mapped into a one dimensional domain and then indexed based on a Prefix Hash Table (PHT) structure. The resulted PHT structure is then distributed across discovery service providers. Discovery service providers are connected in a Distributed Hash Table (DHT) overlay network.

Such an architecture is able to address the need for discovering the entities such as RFID tags. The major shortcoming of this approach is again inefficient indexing mechanism which does not appropriately scale with the size of the IoT data. Mapping the data attributes to one dimension also makes the processing even more challenging.

The above mentioned studies consider RFIDs as the only source of data; in contrast the Linked Stream Middleware (LSM) architecture focuses on sensors and actuators. The LSM provides a framework for providing semantic description (i.e. RDF descriptions) for the sensors and actuators data and allows for SPARQL-like queries across both resources and the harvested data. The sensory data in LSM is annotated and transformed into RDF triples. The triples are then stored in storage, which is capable of executing the SPARQL queries. The main shortcoming of the LSM framework is the lack of scalability due to the centralized architecture. The query execution time is shown to drastically increase with the number of provided triples. Moreover, triple storages are not designed for writing intensive applications and insertion of numerous new data into the triple storage creates a bottleneck for the system.

To summarize, scalability is a common problem associated with the conventional IoT data discovery mechanisms. At the heart of the problem is the data indexing mechanism. While the indices should provide sufficient information for DSs to address the queries, they should be generated in a way that allows for dynamic update with a minimum computation overhead despite of the scale of the data providers. The traffic load associated with the communication of indices between gateways and DSs and even between DSs should not also extensively increase with the number of data resources. Yet, the existing indexing mechanisms fail to satisfy these requirements.

With the foregoing as background information, the present application discloses a new method and system for discovery services in an M2M network.

SUMMARY

The IoT provides a unique opportunity to observe and measure real world phenomena and occurrences more than ever in human history. However, heterogeneity of the real world data and sensory devices, scale and distribution of the networks and resources, and dynamicity of the real world environments has made the data management of IoT very challenging. First, IoT data can be provided to the clients without requiring knowing the actual source of the information. The specifications of the clients' (i.e. data consumers) interest, represented as a query, are composed of attributes of the requested data. The IoT discovery services process the queries and discover the data in a distributed environment. The common assumption of previously proposed search and discovery mechanisms is that the attributes of each individual data are indexed and stored in DSs. The discovery services then utilize the provided indices to route the queries to gateways or IRs which contain the queried data.

In dealing with extremely large scale IoT data, maintaining the index of individual IoT data items across the network will not be a feasible solution. The dynamicity of IoT environments and mobility and unreliability of the underlying sensors and devices imply that the data sources and consequently the indices are subject to frequent updates. The rate of updates and changes of the data attributes (such as location, quality) multiplied by the scale of IoT data resources indicates that maintaining the indices based on conventional approaches will impose a huge traffic load on the network. In addition, searching the attribute space at the DS level can be computationally expensive.

Designing a scalable IoT data discovery solution and overcoming the shortcomings in existing approaches for data discovery is a difficult problem.

In order to resolve the aforementioned shortcomings, embodiments disclosed herein use a scalable data discovery mechanism based on disseminating compressed indices of the available data across the network. These embodiments can use a minimum communication overhead to provide adequate references to data at DSs. This can be achieved by summarizing the attribute space of the data with parameters of probabilistic models that are trained over these attributes. To handle the frequent updates of the attributes, some embodiments can take advantage of two independent update processes which are initiated at different intervals. A novel attribute variation compensation mechanism can provide sufficient information for adaptation of the provided models to the recent change of the attributes. The results of extensive evaluation indicate that the embodiments disclosed herein outperform the conventional discovery mechanisms.

Embodiments can include:
  A new hierarchical architecture for data discovery in heterogeneous and dynamic IoT networks. The new hierarchical architecture can include model-based data attribute summarization, data attribute updating, and model-based data query.
    IoT data attributes can be first summarized at the network edge based on a probabilistic model, such as a Gaussian Mixture Model (GMM). The summarized data attributes can be reported to the DS and can be updated later. The summarized and aggregated data attributes can be later leveraged as indices for model-based data query.
  A new mechanism for summarizing IoT data attribute at the edge of IoT network.
    The distribution of data attributes can be estimated based on a GMM at the edge of the IoT networks (i.e. on the gateway nodes or cluster heads in WSNs). Parameters of the provided GMM model can then be propagated through the network and aggregated at higher layers of the network i.e. DSs. In this regards, adequate reference to the original parameters can be provided across the network.
  A new mechanism to update the variations of the attributes. In particular a novel computationally efficient mechanism can be used to adapt the learned model parameters for short-term updates.
    To handle the frequent updates of the attributes, the proposed approach can take advantage of two independent updating processes which are initiated at different intervals. A novel attribute variation compensation mechanism which provides sufficient information for adaptation of the provided models to the recent change of the attributes can be used A new query-processing scheme can use the GMM parameters to accurately and efficiently route the queries to the edge nodes where the data is stored.

In one embodiment, sensor data from a group of sensors is stored at a location in the M2M network. The location can be a gateway, an Information Repository IR, or other network location. A probabilistic model of attributes of the sensor data is produced at the location in the M2M network. The probabilistic model can be a mixture model, such as a Gaussian Mixing Model (GMM). Parameters of the probabilistic model are then propagated to a discovery server in the M2M network for use in data discovery. Since the parameters are compressed compared to the attributes of the sensor data itself, this can simplify the distribution of discovery data.

The probabilistic model, such as the Gaussian Mixing Model (GMM), can be constructed using an Expectation Maximization (EM) algorithm or other algorithm.

The location that stores the sensor data and produces the parameters can be a gateway with the at least one group of sensors connected to this gateway. Further, the discovery server can be connected to additional gateways and this discovery server can produce a second probabilistic model using the parameters from the gateway and parameters from additional gateways.

The discovery server can be part of a hierarchical arrangement of discovery servers. For example, in one embodiment, the hierarchical arrangement uses three layers of discovery servers.

Discovery servers in a lower level can send parameters of the probabilistic models up to higher levels of the hierarchical arrangement. Discovery servers at these higher levels can produce more generic probabilistic models.

The parameters can be updated using a short term update and a full parameter update. The short term update can be computationally less intensive than the full parameter update. The short term update can be a variation compensation update that produces compensating parameters that can be combined with parameters from an earlier model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 6 shows a pseudo code of query processing in one exemplary embodiment.

FIG. 7A is a map that shows an example set of sensors of a particular type in a WSN that is generated through simulation.

FIG. 7B is a map that shows the contours of the GMM model which is generated to summarize the distribution of the sensor locations that are shown in FIG. 7A.

DETAILED DESCRIPTION OF ILLUSTRATIVE EMBODIMENTS

Figures 1, 2:
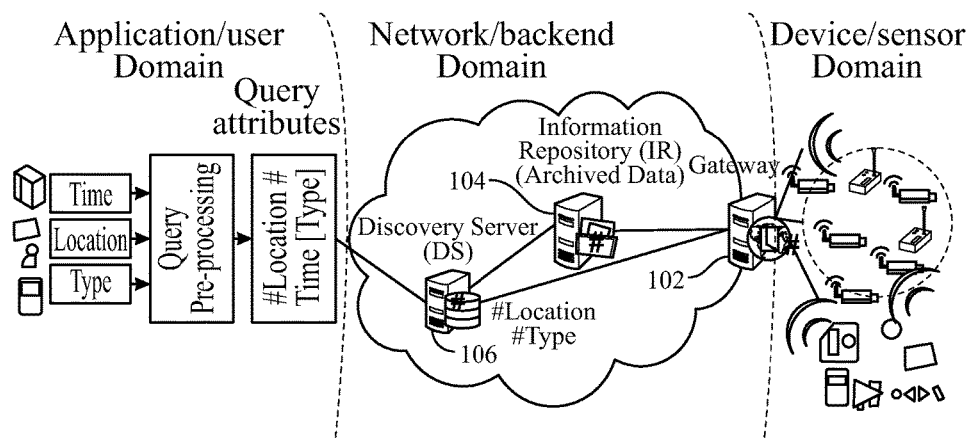
FIG. 1 is a semantically annotated description of sample temperature data.
FIG. 2 is a diagram that illustrates an M2M architecture view that shows key components that are typically involved in data collection, dissemination and discovery in the IoT systems.

Embodiments disclosed herein can use mechanisms including attribute summarization, summary updating and data discovery. The integration of these mechanisms can allow for efficient indexing and discovery of the data resources. An attribute summarization can provide concise indices or references to the data which can be communicated within the network entities with a minimum traffic load. A summary updating mechanism can ensure the accuracy the indices over time by reflecting the variations of the data attributes to the attribute summaries. A data discovery mechanism enables DSs to utilize the provided references and direct the queries to the storing node at the edge of the network that is most likely to contain the requested information.

Let's assume that d is a data item that is presented by a finite number of attributes. As a valid data item, d is a member of ensemble of data items that are available at a gateway in the network. Let's consider $D_n$ as the set of data items that are available at a gateway "n" where n∈N and N represents all the available gateways (that provide data) in the network. The processing of a query for data item d is then equivalent to finding n where d∈$D_n$. To perform the query at n the attributes of the query item are contrasted against the attributes of the available data items at Dn. Data attributes are selected from a finite set of attributes by which the IoT data is uniquely described, such as location and type. Let's assume that attribute x has an alphabet $A_x=\{a_{x1}, \ldots, a_{xs}\}$. Query for a data item (q) that is described with attributes x, y and z, is then represented as $q=\{x=a_{1k} \& y=a_{y1} \& z=a_{zm}\}$.

According to the information theory, the average number of matching processes that are required to resolve this query at n would be equivalent to the entropy of the (x,y,z) triple on $D_n$.

$$Q(d) = H(x, y, z) = H(x) + H(y|x) + H(z|x, y) \quad (1)$$

and $$H(x) = -\sum_k p(a_{xk})\log p(a_{xk})$$

In which Q(d) represents the average matching processes required for querying d, $p(a_{xk})$ is the probability of finding $a_{xk}$ over all the entries for attribute x at the $D_n$, and H(x) is the entropy of the values of x at the $D_n$.

The third part of equation (1) resembles the reduction of the searching space when the attributes are sequentially matched with their counterparts that are provided in the query. It is worth noting that, third part of (1) implies that the key parameters in reducing the searching space are the conditional probabilities e.g. $p(A_2|A_1)$ and $p(A_3|A_2,A_1)$. Probability values can be constructed based on individual data items that are stored at the information repositories or gateways. In classic information retrieval and data discovery often an index of the data is constructed and then the query parameters are evaluated against the indices. Comparing the indices to the query parameters deterministically decrease the search space in the discovery process. However, as it was explained earlier this requires maintaining a huge amount of indices across the network.

Embodiments disclosed herein reduce the subspace probabilistically. A summarization process can replace the conventional indices with mathematical models that approximate the distribution of the conditional probabilities of the attributes. The models can be learned locally where the actual data is stored (i.e. gateways). Gateways can propagate the leaned model parameters to the DSs as a reference to their stored data. DSs utilize these references, similar to the indices in conventional techniques, to resolve the received queries.

Still, estimating the conditional probability among a number of multi-dimensional attributes is challenging. One solution could be to construct a probabilistic model that covers all the attributes as different dimensions of the training data. This approach is prone to curse of dimensionality, which arises when a high dimensional data is to be learned from a limited number of samples. In addition, exact number of distinct parameters and their distributions are not priori known; a generic probability model cannot adequately estimate the underlying distribution. The second challenge is to select an appropriate model to represent the distribution of the attribute. It is worth noting that using a discrete probability model, is indeed faced with shortcomings similar to the conventional indices. Fitting continues models that can be represented with limited number of parameters over a Probability Distribution Function (PDF) tend to be a more appropriate solution in which the parameters of continues model can be efficiently communicated between the nodes across the network to provide the required references. However, continuous model contaminates the query processing with false positive errors. In fact, the accuracy of the query processing will depend on closeness of fitted model to the real probability distribution of the data attributes. In this regard, selecting an appropriate probability density estimation model is critical for the preserving performance of the query processing To resolve the first problem, embodiments disclosed herein can reduce the data dimensions by training multiple models, each of which is trained on a subset of data. In one embodiment, first the available attributes are sorted according to the entropy of their available values. Then starting from the attributes with highest entropy, the distributions of the attributes with higher entropies are modeled under specific values (or ranges) of the attributes with lower entropy. Each model would then provide conditional probability estimation of two attributes. In this regard, the ratio of the number of data points to the dimensions of data at the training process of each individual model is improved which in turn mitigates the dimensionality problem. To address the second problem, embodiments disclosed herein use a mixture model, such as a GMM model, which can approximate the distribution of the attributes with an appropriate accuracy.

A mixture model is a probabilistic model for representing the presence of subpopulations within an overall population. A Gaussian Mixture Model (GMM) is a parametric probability density function represented as a weighted sum of Gaussian component densities.

Due to the dynamicity of the attributes of the IoT resources, the provided model parameters can be frequently updated. Indeed frequent re-learning of the model parameters would be a computationally expensive task that poses delay to the query processing. To resolve this issue, the embodiments disclosed herein use two types of update processes with different frequencies.

A first process can be triggered in relatively short intervals depending on the dynamicity of the attributes of the data. In this process, the available model parameters that describe the distribution of the conditional probabilities are considered to be more or less a valid representation of the overall data and will be only adapted to the recent variations that have happened since the last interval.

The second type of update process can be triggered at longer intervals; when the existing model parameters are no longer sufficient for representing the IoT data. This can be performed when the proportion of the changed attributes is comparable with the original attributes that were used to construct the initial model. In this case, a new summary of the available data is obtained.

Once GMMs are trained over the attribute space of the available data resources at a gateway or an information repository, it can be used as a reference to the training data across the network. The model parameters can be forwarded to DSs across the network. Parameters from the various gateways at a DS would be aggregated to create a more generic model. When a DS receives a query, depending on whether the requested data falls within the available summarized data or not the DS would pass the query to the gateways that are registered at that DS or redirect it to the other DSs in an overlay network between the DSs. Indeed routing the queries between DSs is dependent on the architecture of their overlay network.

Figure 3:
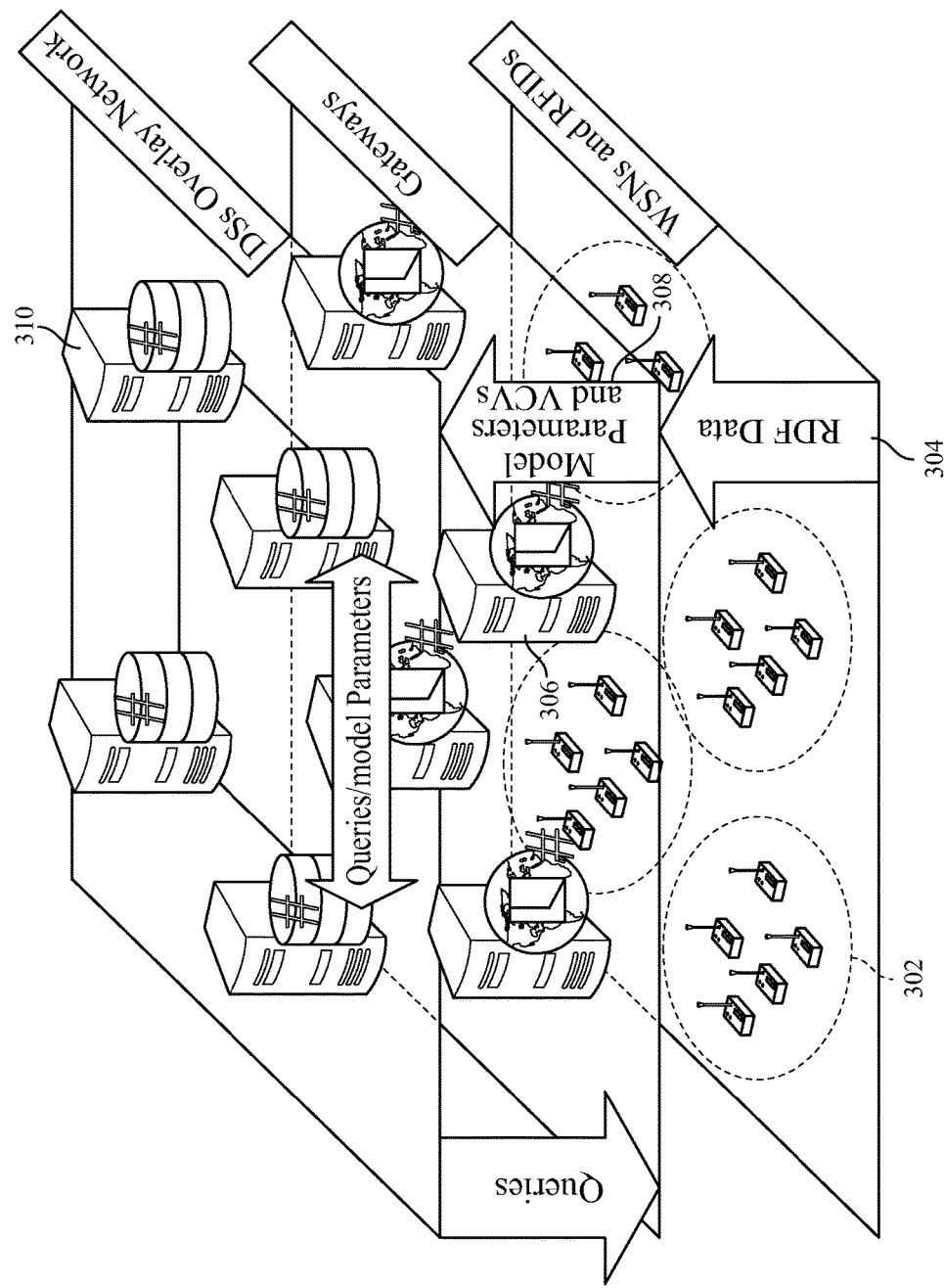
FIG. 3 is a diagram that illustrates a proposed data flow across the network in accordance with one embodiment.

FIG. 3 is a diagram that illustrates a proposed data flow across the network of one embodiment disclosed herein. In this figure, WSNs 302 at the lowest layer provides the RDF formatted sensory data 304 to the gateways 306. Gateways 306 then generate the GMM models and propagate the mode parameters 308 to the DSs overlay network 310. Updates to the references are provided by generating new parameters.

Figure 4:
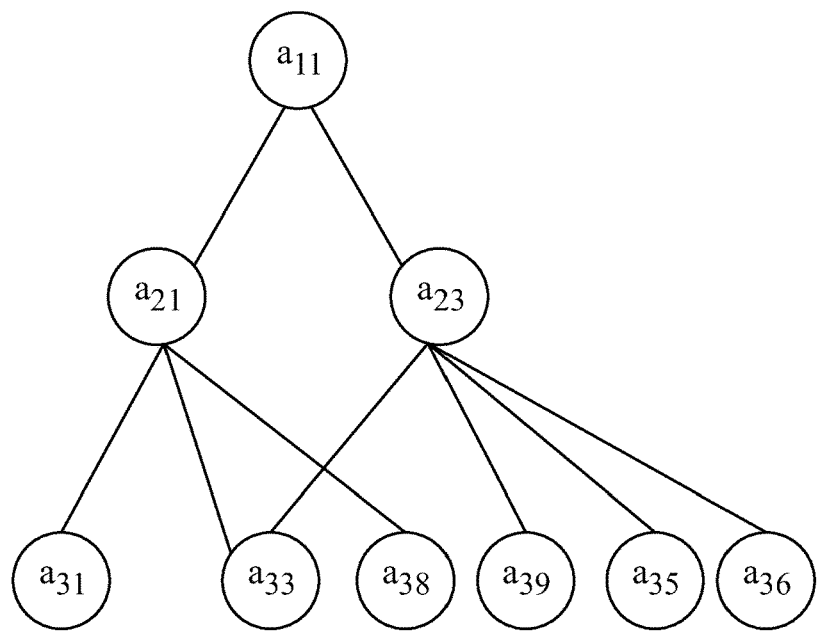
FIG. 4 is a graph that represents an example of the attributes that are stored for seven data items.

In the following section a proposed approach for probabilistic referencing of the data attributes is described. At the heart of the solution is a probability distribution model that summarizes the distribution of the data attributes that are available at a given node in the network. FIG. 4 is a graph that represents an example of the attributes that are stored for seven data items. In this example dataset, there are 7 data items and each data item has 3 attributes. For instance, (ax1, ay1, az1) is one data item.

For example d is a data item in this set that is represented as d={x=$a_{x1}$, y=$a_{y1}$, Z=$a_{z1}$}. Now, if p represents the probability density function of the attributes of all data items that are presented in FIG. 4, the probability of finding a data item d within this set would be equal to:

$$P_d = p(x==a_{11} \cap y==a_{21} \cap z=a_{31}) = p(a_{x1}) * p(a_{y1}|a_{x1}) * p(a_{z1}|a_{x1}) * p(a_{z1}|a_{y1}, a_{x1}). \quad (2)$$

Since data item d actually does exist in this set Pa is expected to be greater than zero. Similarly $P_{d*}$ should be zero when data item d* does not belong to this set. An interesting outcome of this representation is the flexibility in responding to different types of queries including range queries or queries with incomplete attributes. This is simply achieved by integrating the probability values. This phenomenon can be exploited to find the correct repository across the network for the queried data item. A proposed heuristic approach for estimating the conditional probability models is described below.

Once sufficient data items are stored at a gateway or IR, the entropies of the data attributes are calculated. At this item, it is presumed that there is no missing attribute in the stored data. Therefore, the total number of entries for all data attributes would be the same. Next, starting from the attributes with the highest entropy, the conditional probability of an attribute value with respect to that of less variant attributes is estimated. For example, in FIG. 4, $A_3$ has the highest entropy; therefore the first step would be to estimate the probability density of z values over distinct values of y. This is performed by calculating the p(z|$a_{y3}$) and p(z|$a_{y1}$) to determine the p(z|y). Next p(y|x) is calculated in a similar manner. In simulation studies discussed below, we model the distribution of location attributes for each type of resources. Here the type's variance is expected to be less than that of the locations. Therefore, terms in second part of equation (2) are calculated through the estimation of the conditional probabilities as described above.

The probability distributions can be computed at the gateways 306 and are communicated to DSs 310 as a reference to their training data. In order to model the conditional probabilities, the GMM technique can be used. GMM is a parametric probability density function which is represented as weighted sum of Gaussian component densities. GMM is a generative learning algorithm that assumes a probabilistic pattern, dependent on certain parameters, between data and classes and through the learning process specifies a joint distribution over data and recognised classes.

GMM can approximate any probability distribution with a reasonable accuracy provided that the number of Gaussian components is sufficiently large and the parameters of the model are chosen correctly.

GMM can be implemented as a complete unsupervised technique which is helpful for autonomous processing and discovery of large-scale distributed IoT data. GMM can be enhanced with the state of the art techniques such as that described in Z. Daming, G. Hui, and L. Bin, "*An algorithm for estimating number of components of Gaussian mixture model based on penalized distance,*" in Neural Networks and Signal Processing, 2008 International Conference on, 2008, pp. 482-487 to estimate the required number of Gaussian parameters autonomously.

Given that the number of required components that are estimated by one of the aforementioned techniques e.g. those described in Daming, the GMM can calculates the model parameters through an Expectation Maximisation (EM) process. It can be shown that EM algorithm monotonically improves the likelihood of the model i.e. p (x|φ, E,σ) for describing the training data i.e. attribute x. Here φ is the mixing proportion of the components, E is the expected value of the attributes and σ is the covariance matrix of attributes. An exemplary EM algorithm for training the GMM can be formulated as follows.

E-step (expectation): Here the posterior probabilities are calculated based on the current guess of parameters.

$$\omega_k^l = Pr(Mc = k \mid x^l; \varphi, E, \sigma) = \frac{p(x^l \mid Mc = k; E, \sigma) * p(Mc = k; \phi)}{\sum_{h=1}^{C} p(x^l \mid Mc = h; E, \sigma) p(Mc = h; \phi)}, \quad (3)$$

Here C represents the total number of mixture components (Mc), $x^l$, represents the vector of attribute values for the $i^{th}$ data entry, $\omega_l^k$ is a posterior probability of the $k^{th}$ Gaussian mixture component (Mc) given $x^l$.

M-Step (maximisation): at this step model parameters are calculated in way that maximizes the log-likelihood of p (x|φ, E, σ).

$$\varphi_k = \frac{1}{L}\left(\sum_{l=1}^{L} \omega_k^l\right) \quad (4)$$

$$E_k = \frac{\sum_{l=1}^{L} \omega_k^l x^l}{L * \varphi_k} \quad (5)$$

$$\sigma_k(x) = \frac{\sum_{l=1}^{L} \omega_k^l (x^l)(x^l)^t}{L * \varphi_k} - (E_k)(E_k)^t. \quad (6)$$

$\varphi_k$ is the mixing proportion of the $k^{th}$ Gaussian component. $E_k$ is the estimation of the mean of the $k^{th}$ Gaussian component. $\sigma_k$ is the estimated covariance of the $k^{th}$ component. L is the total number of data entries. The algorithm then iterates between E and M steps until it converges (i.e. until there are no significant changes on the likelihood function).

GMM models can be trained over the sorted attributes of a dataset at the gateways. The model parameters alongside with the number of total data samples that are used during the training phase (i.e. φ, E, σ, L) can be forwarded to the DS that is assigned to this gateway.

Assigning the gateways to the DSs can be based on location proximity, network connectivity or other criteria.

GMM models of different attributes from different gateways are aggregated in DSs to form a more generic GMM model. The aggregated model in each DS represents the probability distribution of the attribute for the datasets that are collected and/or stored in the underlying gateways and repositories which are associated to the current DS. The aggregated model comprises the Gaussian components of the initial models but with different mixing proportions. The new mixing proportions can be calculated as follows.

$$\varphi'^{j}_{k} = \frac{L_j * \varphi^{j}_{k}}{\sum_j L_j}, \quad (7)$$

where $\varphi'^{j}_{k}$ is the new mixing proportion of the $k_{th}$ Gaussian component of the $j_{th}$ GMM model and $L_j$ is the total number of samples that are used for constructing the $j_{th}$ GMM model.

The aggregation process can ensure the homogeneity of the models that are aggregated. This can be achieved by preserving the order of the attributes in learning the conditional probabilities. Since the ratio of the entropy of the data attribute values varies between resources, the order of selected attributes during the learning process is not necessarily preserved. In this case, DSs can utilise the provided model parameters to resample the data. Then, similar to the estimation process at the gateways, the selected attributes can be sorted and new models can be trained based on them. It is worth noting that, the aggregated model is a reference to all the data provided at a DS. DSs can estimate the probability of the presence of a data item at an underlying gateways based on the GMM models that the queried gateway has provided and regardless of the order of attributes in the provided models.

The provided model can be then shared with other DSs in the network. Depending on the network architecture the shared models can be again aggregated with other models to construct a global distribution model for the underlying data. As described in section 7, the aggregated models may be evaluated with respect to each other to enhance the locality of the data across the network. The model parameters may quickly become obsolete due to the variation of the data attributes, e.g. when the resources (i.e. sensor nodes) are highly mobile and their location attributes changes frequently or the scenarios that several resources join and leave the network in a rapid pace.

Embodiments disclosed herein can use a mechanism that updates the parameters across the network and meanwhile imposes a minimum computation and communication overhead. Embodiments can perform the required updates in two different intervals and Variation Compensation Parameters (VCP) can be used to estimate the modified model. Different approaches can be taken based on the dynamicity scenarios which can allow for computationally efficient updates.

The variations of the data attributes over time can be reflected into the probabilistic references through the summary updating process. The summary updating process can retrain the models over the new data at the gateways and send the new GMM parameters to the DSs. DSs can also update or retrain their model subsequently. Hereby we refer to this type of update as Complete Updating process and its associate interval is represented by T. Due to the volume of the data, such complete updates imposes a considerable computation cost and cannot be performed frequently. Preforming updating process in long intervals is also not desired as it degrades the performance of the approach due to the variations that take place within the update intervals.

To resolve this problem and to achieve more accurate references during the update intervals Temporary Updating can used. The idea is to perform temporary updates in a higher frequency with respect to the complete updates. We represent the update period of the temporary updates with t and assume that t<<T. Temporary updates take advantage of a mechanism which is named as Variation Compensation.

Throughout these temporary updates we assume that the existing GMM models are still a valid representation of the distribution of the existing attributes. The model parameters are then adapted to reflect the recent changes that have occurred in the underlying resources (e.g. new nodes are connected and new datasets have become available or some nodes have become unavailable and subsequently the data that were provided by them have become unreachable). The adaptation process is based on combining the parameters of the original models with compensating parameters that are calculated from the data items that are changed after the last update (original or temporary update). The modification information is hereby referred to as VCP.

The modified model after each temporary update is used as a base for the next updates. The temporary updates can start after an original updates and be repeated several times till the original update period is over. The existing model is then made obsolete and a new model is generated using a new original update.

The process for calculating VCPs can depend on how the stored data items are changed. Three scenarios for alternation of the attributes are described below including: addition of new resources in WSNs, removal of obsolete resources (the resources that have become unavailable or have disjoint the WSNs) or variation of the attribute values of the existing resources e.g. change in the resolution of measurements or variation of the location attributes due to the movement of the device.

Similar to a Maximum A Posteriori (MAP) estimation approach, a proposed solution for adapting the model parameters is performed in two steps. The first step is to calculate sufficient statistics of the variations. This step is similar to the Expectation process in GMM that is described above. Hereby we denote the parameters that are calculated at this step with "~" e.g. $\tilde{\varphi}, \tilde{E}, \tilde{\sigma}$. The second step combines the new parameters that are derived from the first step with parameters of the original model to create an adapted model. We denote the parameters that are calculated at this step with "^" e.g. $\hat{\varphi}, \hat{E}, \hat{\sigma}$.

While MAP tends to combine the parameters of the original model and the one from the training set in a way the emphasis is put more on the characteristics of the new training model, embodiments disclosed herein strive to use the original and new parameters (that are derived at the first step) to generate an estimation of a GMM as if it was trained over the entire data.

In case of adding new resources, an exemplary formulation of the first step would be as follows:

$$\tilde{\omega}^{j}_{k} = Pr(Mc = k \mid x^{j}; \varphi, E, \sigma), \quad (8)$$

$$\tilde{\sigma}_{k} = \frac{1}{I}\left(\sum_{i=1}^{I} \tilde{\omega}^{j}_{k}\right), \quad (9)$$

$$\tilde{E}_k(x) = \frac{\sum_{i=1}^{I} \tilde{\omega}_k^i x^i}{I * \tilde{\varphi}_k}, \quad (10)$$

$$\tilde{E}_k^2 = \frac{\sum_{i=1}^{I} \omega_k^i (x^i)(x^i)^t}{I * \tilde{\varphi}_k}. \quad (11)$$

Once sufficient statistics are calculated, the gateway updates these parameters at DS. The adopted parameters can then be calculated based on the previous model parameters and updated statistics as follows.

$$\hat{\varphi}_k = (L * \varphi_k + I * \tilde{\varphi}_k)/(L+I), \quad (12)$$

$$\hat{E}_k = \frac{L * \varphi_k * E_k + I * \tilde{\varphi}_k * \tilde{E}_k}{L * \varphi_k + I * \tilde{\varphi}_k}, \quad (13)$$

$$\hat{\sigma}_k = \frac{(\sigma_k * \sigma_k^t + E_k * E_k^t) * L * \varphi_k + \tilde{E}_k^2 * I * \tilde{\varphi}_k}{L * \varphi_k + I * \tilde{\varphi}_k} - \hat{E}_k * \hat{E}_k^t. \quad (14)$$

A closer look to equations (12)-(14) indicates that the estimated parameters are reminiscent of equations (4), (5) and (6). Here instead of original data (L data resources) the entire of the existing resources (i.e. L+I data resources) are used.

As was mentioned earlier, the M-step of the EM algorithm maximizes the log-likelihood function for the given value of the posteriori probabilities. Given that the posterior probability is provided from the original model the second step of the update process calculates the model parameters in a way that maximize the log-likelihood function of the model.

It should be noted that the original model parameters that were calculated in a similar manner at equations (4), (5) and (6) from the same posteriori probabilities are now providing suboptimal results due to the modified portion of the data.

It is worth noting that, different from the original training, temporary update process is not iterative and only requires the learned parameters from the original model alongside with the modified data.

In case of removal (i.e. when the resources leave and their data become unavailable), after calculating the sufficient statistic form equations (8-11) the updated parameters can be calculated as follows.

$$\hat{\varphi}_c = (L * \varphi_k - I * \tilde{\varphi}_k)/(L-I), \quad (15)$$

$$\hat{E}_c = \frac{L * \varphi_k * E_k - I * \tilde{\varphi}_k * \tilde{E}_k}{L * \varphi_k - I * \tilde{\varphi}_k}, \quad (16)$$

$$\hat{\sigma}_c = \frac{(\sigma_k * \sigma_k^t + E_k * E_k^t) * L * \varphi_k - \tilde{E}_k^2 * I * \tilde{\varphi}_k}{L * \varphi_k - I * \tilde{\varphi}_k} - \hat{E}_k * \hat{E}_k^t. \quad (17)$$

In case of the variation of the attribute values of existing resources, first the old attributes can be removed according to equations (8-11) and equations (15-17) and then the new attributes can be added based on equations (8-14).

User queries are received from DSs across the network. As mentioned earlier, each query can contains a number of attributes that specify different features of the requested data (e.g. location, type, time). The queries are submitted to DSs and the data discovery mechanism then identifies the gateways or repositories that may contain the data and forwards the request to these sources based on a likelihood measure (that is obtained from the probabilistic model). The gateways or information repositories can then process the query and return the requested data or inform the DS that the requested data is not available in that particular source (which then the subsequent sources that has the next highest likelihood value is queried). The data discovery mechanism can be dependent on the architecture of the overlay network.

Exemplary architectures can follow a hierarchical structure. In comparison with other state-of-the-art overlay network structures, such as DHT peer-to-peer based solutions described in F. Paganelli and D. Parlanti, "*A DHT-Based Discovery Service for the Internet of Things*," Journal of Computer Networks and Communications, vol. 2012, p. 11, 2012 or centralized architectures such as D. Le-phuoc, H. Nguyen, M. Quoc, and J. X. Parreira, "*The Linked Sensor Middleware—Connecting the real world and the Semantic Web*," pp. 1-8, the hierarchical structure can allow fast and efficient processing of the queries by preserving the locality of the data. Multidimensional and range queries can be also processed easier in hierarchical networks.

Figure 5:
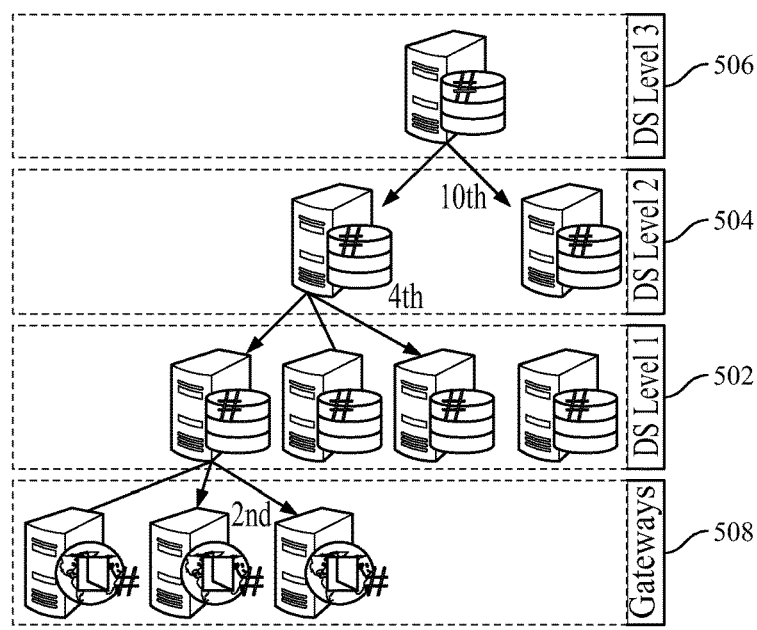
FIG. 5 is a schematic diagram of a hierarchical architecture with three layers in accordance with an embodiment.

FIG. 5 is a schematic diagram of a hierarchical architecture of one embodiment with three layers. The approach is flexible in terms of the number of layers in the hierarchy. The thick black arrows show the most probable path and gray arrows are other subsequent attempts. Shown in FIG. 5 are three layers of DSs, DS Level 1 (DS1) 502, DS level 2 (DS2) 504, and DS level 3 (DS3) 506. Also shown are gateways 508. Although, the example of FIG. 5 uses three levels of DSs, a hierarchical architecture can include a different numbers of DS layers in other embodiments.

Ideally DSs should take advantage of the received GMM models to preserve the locality of the referenced data using an outlier detection algorithm. DSs should ask their upper node to find a more appropriate DS to reference the outliers. Preserving the locality of the referenced data can improve the accuracy and speed of query processing. However as is described in the next section, in case of modeling unique attributes such as location, there would be no need for an extra outlier detection mechanism.

To route the queries across DSs, embodiments can use two types of models that are available at a DS after constructing the GMM models. The first model is the DS (aggregated) GMM model. The second model is the GMM model of each lower layer nodes that are registered to a DS. It is worth noting that the second model may also include the aggregated models of other DSs from lower layers. Queries are forwarded between DSs and gateways by following the most probable path (i.e. the node that has the highest likelihood to contain the requested data). However, identifying the most probable node is not as straight forward as it may seem.

As more and more GMM models aggregate at higher layers in the network, the aggregated models become less sensitive to the probability of the individual data items. As shown in equation (5), the presence probability of a data item that is initially learned at the gateway is reduced by aggregating several models at the upper layers in proportion with the number of data items that are referenced in a lower layer (i.e. an individual node). This effect can mislead the querying processing mechanism when the number of data items in the upper layers increases.

To resolve this issue, the query can be expanded and instead of querying single data items, the query is modified to include a range of proximity data items. To extend the queries, we interpolate a number of data items around the queried data item before initiating the probability estimation at each node. The interpolated items can be normally distributed around the queried data item and their number is in proportion with the total referenced data at that node. A natural selection for standard deviation of the interpolation is the expected value of the standard deviation of the Gaussian components that are available at that level. As the query traverses the network node towards the lower layers, models are becoming more sensitive to individual data items and in this regard the interpolation radius should be reduced. In this regard, a division factor is introduced that is multiplied with the standard deviation of the interpolation and it varies with the layer number.

In an exemplary embodiment, based on a number of evaluations, the division factors are set as follows: the division factor is set to 1 for DS layer 2 which makes the standard deviation of interpolation equal to the expected value of the standard deviation of the models. In DS layer 1, the division factor is set to 10 and at the gateways it is set to 100.

Second, in an exemplary overlay network architecture, each DS can only estimate the presence of the queried attributes within its underlying node and it is ignorant to the rest of the network. In other words, in order to decide to forward a query at a DS, a global understanding about the probability distributions across the network is required.

In one embodiment, the solution is to start the processing from the node at top of the hierarchy. Based on the example architecture provided FIG. 5 this means to start the query processing at the 3rd layer and strive to resolve the most probable path toward the gateways. The black arrows shown in FIG. 5 illustrate an example of the paths that query may traverse to find a gateway that has the highest likelihood of containing the requested data.

Third, although most of the queries are expected to be answered by following the most probable nodes, there still will be cases in which the data discovery cannot find the data by the first attempt. This problem can arise when the GMM models have overlaps.

In one embodiment, if the initial attempt was not successful, the DS of layer one, which has previously forwarded the query, tries other underlying gateways. The gateways assigned to this DS are then queried in the order of their probability estimation. If the second attempt was not also successful, the query is processed form the upper layer and other DSs in that higher layer are queried according to their probability estimation for the queried data. Search for desired resource (e.g. to find a gateway that contains the requested data) continues to other layer in a similar manner and terminates by finding the data or exceeding the maximum limit of the hops allowed. The grey arrows in FIG. 5 resample the additional searches after the failure of the first attempt to respond a query. The second attempt would be to search the other gateways associated to the same DS that the attempted gateway is associated to. In case of subsequent failures gateways, the 4th attempt will try to query the most suitable gateways of second most probable DS (which are determined based on their probability estimations). If the requested data is not found, this process continues in a similar manner to the third layer or terminated once it exceeds a pre-defined number of attempts.

It is understood that the functionality illustrated in FIG. 5, may be implemented in the form of software (i.e., computer-executable instructions) stored in a memory of, and executing on a processor of, a node of an M2M network (e.g., a server, gateway, device, or other computer system), such as one of those illustrated in FIG. 16C or 16D described below.

FIG. 6 shows a pseudo code of query processing in one exemplary embodiment. The box on the right side summarizes the query processing and the left box explains the operation inside the methods that are referenced at the right box The processing is summarized on the right box and the operations inside the methods that are referenced in this box are explained at the left box. Lines 1-6 of the processing code summarize the first query attempt by following the most probable path. Lines 5-16 of the pseudo code explain how other entities in the network are queried when the initial attempts fails. The FINDPATH and SEARCH methods FIG. 6 are referring to the process of identification of the most probable path and search inside the gateway database respectively.

A number of simulations are conducted to evaluate the proposed data discovery approach and updating mechanism. There are three objectives of these simulations. First is to investigate the accuracy and reliability of the proposed model, second is to investigate the scalability of the approach and third is to evaluate the effect update mechanism.

Through MATLAB simulations a random number of Sensors, WSNs, gateways and discovery servers are generated at start of each Monte-Carlo run. GMM models are constructed at the gateways and provided to the DSs of the network as was described in the previous sections. Gateways also store the data attributes information in their local databases. Next each individual sensor is queried from the highest level of the network. The queries are routed to the gateways according to the proposed data discovery mechanism. In one embodiment, at the gateway, a SPARQL query to is run to verify if the queried item is stored at the identified gateway or not. If the query was not successful, search for the suitable gateway continues according to the discovery scheme discussed previously.

In exemplary simulations, the discovery servers are arranged in a hierarchical overlay network with three levels. One DS rests at the top layer (henceforth DS3) and is communicating with a number of DSs at the second layer (hereafter DS2). A number of DS2s may vary depending on the simulation scenario. Each DS2 is connected to a random number of DSs at the first layer (hereby DS1). Similarly each gateway (GTW) may comprises a number of WSNs. Population of WSNs within gateways is defined by a controlled random number and its variance differs in multiple simulation scenarios. The WSNs considered in the simulation include a sink node and numerous sensors. Again the population of the sensors varies based on the simulation scenario. Table 1 summarizes the initial condition of the simulation environment. The component capacity is the maximum allowable number of lower nodes connected to that component.

TABLE 1

Specifications of Initial Conditions of the Simulations

| Component | WSN | GTWs | DS1s | DS2s | DS3 |
|---|---|---|---|---|---|
| Capacity (Initial specification) | 1000 | 1-5 WSNs | 1-5 GTWs | 1-5 DS1s | 4.0 DS2s |

While DS2s and the DS3s are presumed to be independent of any physical location, DS1s are allocated with a random location within the simulation area. The simulation area is a portion of the earth surface with an area of approximately 4800 Km². Gateways are also distributed uniformly around the location of DS1s. The maximum allowable dispersion of the gateways locations varies between 50 km to 150 km. In addition, the sink nodes in WSNs follow a uniform random distribution in proximity of their designated gateway. Maximum dispersion of the sink nodes varies between 10 km to 50 km. The distribution of the sensors locations are also uniform centered by their designated WSN sink node. The maximum dispersion that is allowed in this case is a random value from 1 to 10 km.

It is worth noting that the locations of the sensors are correlated with that of gateways and gateways are also placed close to their DS1s. Therefore, location attributes are then to some extent localized up to the first level of the DSs. The evaluation results shows that even this level of localization of attributes is enough for accurate query processing and without any outlier detection mechanism.

As it was mentioned earlier, the IoT data is often location dependent. We expect that in reality most of the queries (directly or indirectly) to contain information about the location and type of a requested resource. Therefore, through the simulations, the data attributes that are used to construct the GMM models are limited to 'resource type' and 'location'. However, it is clear that the models can be extended to include other or additional attributes. Adding more attributes will require learning and updating more GMM models at each level and subsequently will increase the complexity, computation and update requirements in the overall query processing and discovery mechanism.

FIG. 7A shows an example set of sensors of a particular type in a WSN that is generated through the simulations. FIG. 7B shows the contours of the GMM model which is generated to summarize the distribution of the sensor locations that are shown FIG. 7A.

In order to evaluate the performance of the proposed attribute summarisation and discovery mechanisms different metrics are utilised.

The rate of the successful queries at different attempts of data discovery is used as a key evaluation metric. It is expected that most of the queries to be responded in the first attempt which is based on following the highest probability estimations throughout the network.

The Indexing Efficiency (IE) metric is defined as the ratio of total number of model parameters that are generated from all data items, to the total number of resources that are referenced at the lowest level of the network. This metric denote the efficiency of using the modelling approach for compressing the presentation of the data.

The Computation Efficiency (CE) is used to benchmark the computation time of the proposed data discovery approach against a standard centralised approach similar to the solution described in (Le-phuoc et al.). To simulate the solution that is described in (Le-phuoc et al.), we store all the data items in a large centralised repository. The processing time is calculated as the time required for performing SPARQL queries in the centralised repository. The computation efficiency is calculated based on the processing time of the proposed approach and the baseline model as follows:

$$CE = \frac{T_b - T_{tot}}{T_b}. \quad (18)$$

$T_b$ and $T_{tot}$ represent the median of the measured processing time for the baseline and the proposed approach. $T_{tot}$ includes the total time required for finding the gateways and the time required to process each SPARQL queries at the gateways.

A first category of simulations aim to evaluates the accuracy and scalability of the data discovery scheme against the baseline model. Each simulation scenario of this category investigates the effect of population of a particular network entity over the performance of the data discovery. Starting with different density of the sensors within the gateways, then effects of various densities of gateways that are registered within DS1s are investigated. Next the number of maximum allowable DS1s within DS2s is violated and finally different number of DS2s are utilised and the results of data discovery performance evaluation at each situation is analysed. Each simulation is repeated 5-10 times and the results are averaged.

The second category of simulations is dedicated to the updating mechanism. Here, the performance of the discovery mechanism before and after the updating processes is compared and analysed.

To facilitate the comparison of the simulation scenarios, a Simulation Scenario Number (SSCN) is allocated to each simulation.

The first set of simulations investigates the effect of the capacity of WSNs over the query processing performance. This includes 4 simulation sets each of which specifies a different value for the maximum number of sensors that can be generated at the WSNs starting from 1000 sensors to 4000 sensors. Apart from capacity of WSNs the specification for generation of the other components has been similar to their initial values as was described in table 1. Table 2 represents the average number of the components that were generated through the simulations.

Figure 8:
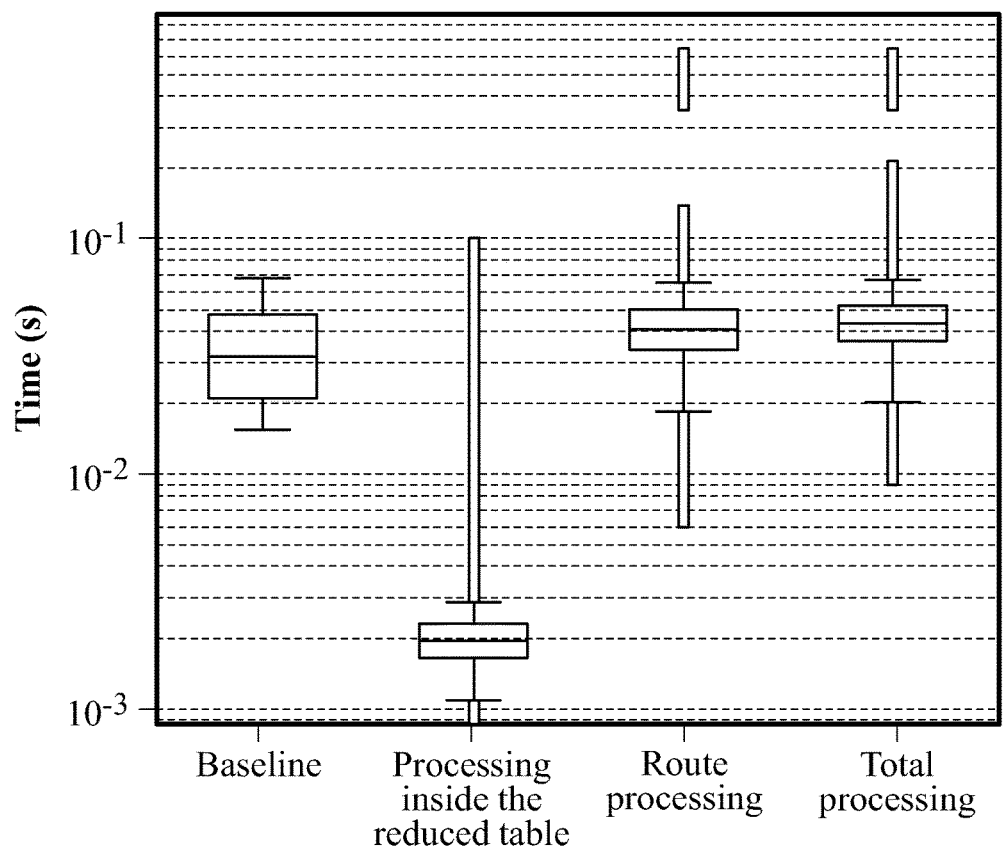
FIG. 8 is a diagram that demonstrates the distribution of the timings of query processing for a baseline solution in comparison with an exemplary solution.

FIG. 8 is a diagram that demonstrates the distribution of the timings of query processing for the baseline solution in comparison with an exemplary solution. It can be observed that in case of the proposed approach, route processing accounts for majority of the processing time.

Table 3 tabulates the simulation results. It can be observed that the majority of the queries are addressed by only following the most probable path (first attempt). Success rates in Table 3 indicate that, misdetection of the DS1s inside DS2s are more significant than misdetection of gateways inside DS1s. This observation can be utilized to enhance the query processing at the situations when the first attempt is not successful.

Furthermore, variation of the IE parameter values with respect to the WSN capacity implies that the proposed approach tends to be more efficient when the numbers of sensors within the WSNs are higher. That is due to the fact that the numbers of generated GMM model communications at the gateways does not grow in proportion with the number of sensors.

TABLE 2

Simulation Environment Summary

| SSCN | Sensors | WSN | GTW | DSL1 | DSL2 |
|---|---|---|---|---|---|
| 1 | 57709.0 | 201.8 | 38.3 | 12.0 | 4.0 |
| 2 | 115210.0 | 194.8 | 39.8 | 11.8 | 4.0 |
| 3 | 147330.0 | 141.2 | 31.0 | 11.2 | 4.0 |
| 4 | 215290.0 | 215.0 | 36.0 | 12.3 | 4.0 |

TABLE 3

WSNs Capacity Effect on Query Success Rate

| | | Success rate (%) | | Efficiency | |
|---|---|---|---|---|---|
| SSCN | WSN capacity | First attempts | First DS1 | First DS2 | CE | IE |
| 1 | 1000 | 94.0 | 94.2 | 98.3 | −1.42 | 0.0018 |
| 2 | 2000 | 98.0 | 98.1 | 99.4 | −0.28 | 0.0007 |
| 3 | 3000 | 98.6 | 98.7 | 99.5 | 0.24 | 0.0006 |
| 4 | 4000 | 99.4 | 99.5 | 99.7 | 0.13 | 0.0001 |

Figure 9:
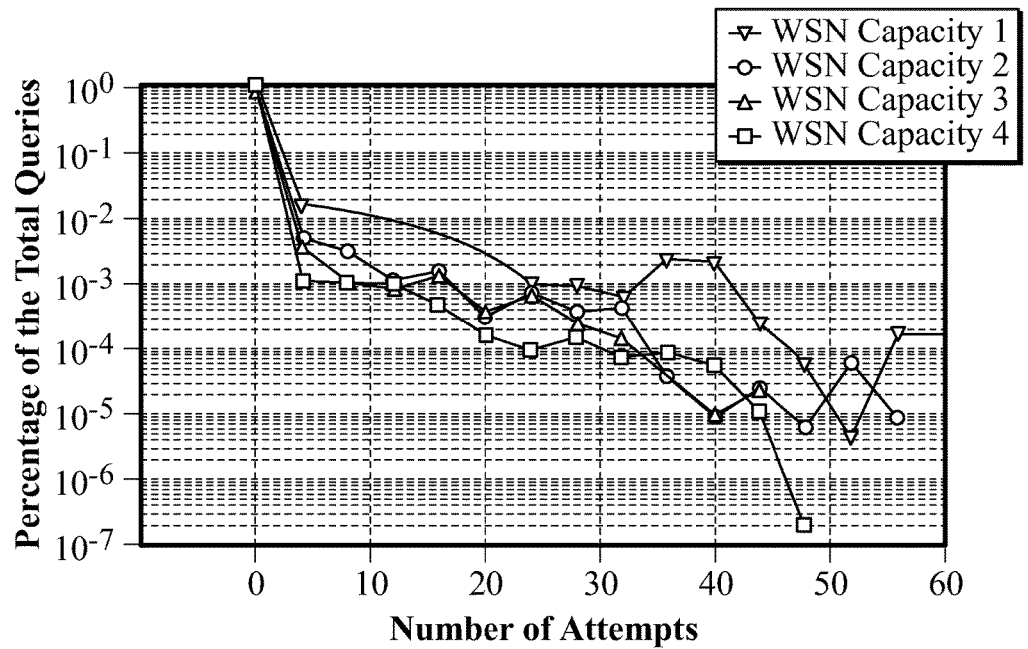
FIG. 9 is a graph that shows the relationship between the number of queries and the number of routing process attempts that has been made to address them for different capacity of WSNs in a simulation.

FIG. 9 is a graph that shows the relationship between the number of queries and the number of routing process attempts that has been made to address them for different capacity of WSNs in a simulation. Capacities 1 to 4 are equal to 1000, 2000, 3000 and 4000 sensors respectively. It can be observed that increase in capacity of the WSNs has improved the accuracy of the route identification, which has result in more successful query addressing at the initial attempts. GMM models may tend to provide a better fit to the distributions of the sensors when the capacity of WSNs increases.

Next set of simulations investigates the effect of gateways capacity over the query processing performance. This includes 4 simulation sets each of which specifies a different value for range of the capacity of the gateways, starting from 2-7 to 3-8, 4-9 and 6-11 WSNs. Other components are generated based on their initial specification that was provided at Table 1. Table 4 represents the average number of the components that where generated through the simulations. Simulation results are presented in Table 5. Results in Table 5 shows that the GTW capacity has almost no effect over the query routing process among these set of simulations. However, the routing accuracy has improved in comparison with SSCN 1, presented at table IV, which has similar specification but less gateway capacity. This can be explained by the increase in number of sensors that where referenced at the gateway.

Figure 10:
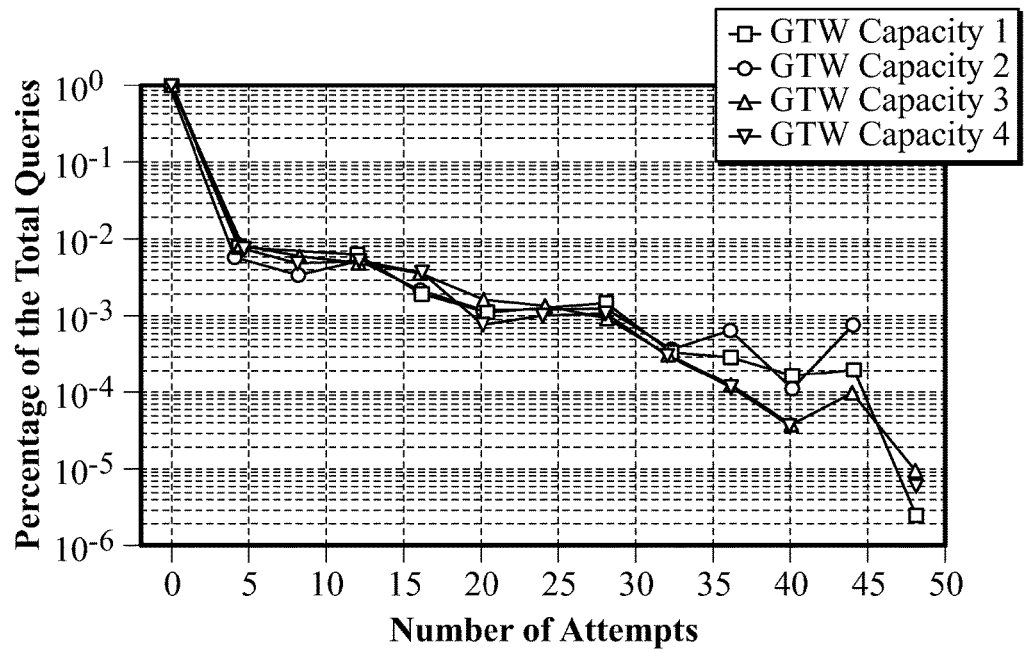
FIG. 10 is a graph of a distribution of the Queries over the Number of Attempts for Different GTW Capacities in a simulation.
Figure 11:
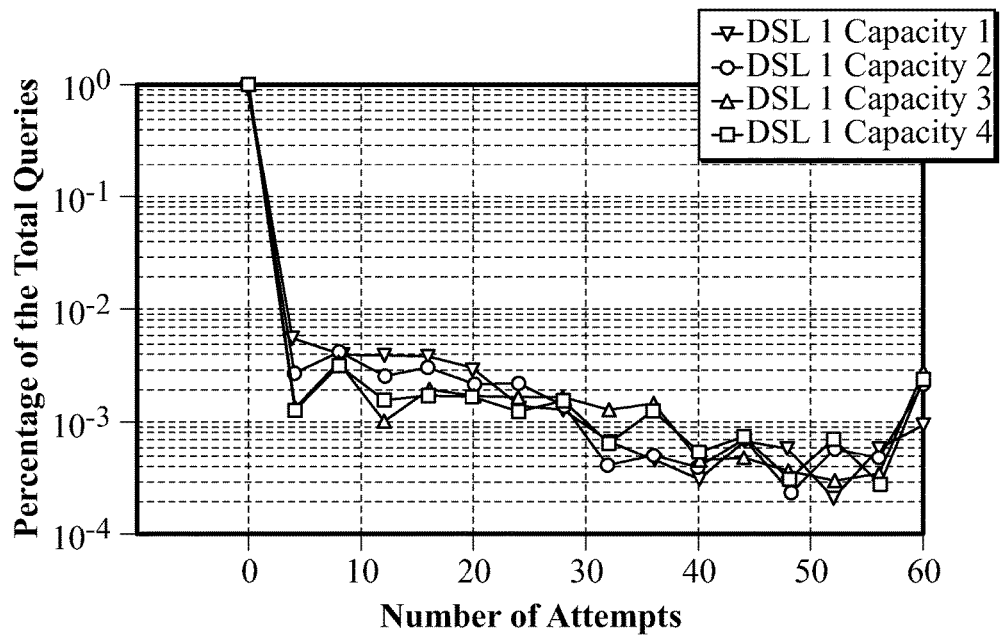
FIG. 11 is a graph that shows the distribution of the Queries over the number of attempts for different DSL1s capacities in a simulation.

Analysis of the required number of route processing attempts in FIG. 10 also agrees with this observation. Improvement of the CE values can be explained by the effect of increase in the number of sensors over the baseline model as was described earlier. FIG. 10 is a graph of a distribution of the Queries over the Number of Attempts for Different GTW Capacities in a simulation. Capacities 1 to 4 are equal to 2-7, 3-8, 4-9 and 6-11 WSNs respectively. Comparison of the IE values also suggests that the number of sensors is a more critical parameter than the number of WSNs at gateways for the number of generated Gaussian components.

TABLE 4

Simulation Environment Summary

| SSCN | Sensors | WSN | GTW | DSL1 | DSL2 |
|---|---|---|---|---|---|
| 5 | 90496.0 | 364.6 | 36.2 | 11.8 | 4.0 |
| 6 | 92355.0 | 464.0 | 35.0 | 10.3 | 4.0 |
| 7 | 98964.0 | 519.0 | 33.0 | 10.7 | 4.0 |
| 8 | 177850.0 | 538.2 | 39.2 | 14.4 | 4.0 |

TABLE 5

Gateway Capacity Effect on Query Success Rate

| | | Success rate (%) | | | Efficiency | |
|---|---|---|---|---|---|---|
| SSCN | GTW capacity | First attempts | First DS1 | First DS2 | CE | IE |
| 5 | 2-7 | 97.0 | 97.2 | 99.0 | −0.62 | 0.0009 |
| 6 | 3-8 | 97.6 | 97.8 | 99.1 | −0.61 | 0.0009 |
| 7 | 4-9 | 97.2 | 97.4 | 98.9 | −0.59 | 0.0009 |
| 8 | 6-11 | 97.3 | 97.5 | 98.9 | −0.12 | 0.0004 |

The following simulations aim to examine the dependency of query processing performance to the DSL1 capacity. This includes 4 simulation sets each of which specifies a different value for range of the capacity of the DSL1s, starting from 2-7 to 3-8, 4-9 and finally 6-11 gateways. Other components are generated based on their initial specification that was provided at Table 1. Table 6 represents the average number of the components that were generated through the simulations. Simulation results are provided in Table 7.

TABLE 6

Simulation Environment Summary

| SSCN | Sensors | WSN | GTW | DSL1 | DSL2 |
|---|---|---|---|---|---|
| 5 | 90496.0 | 364.6 | 36.2 | 11.8 | 4.0 |
| 6 | 92355.0 | 464.0 | 35.0 | 10.3 | 4.0 |
| 7 | 98964.0 | 519.0 | 33.0 | 10.7 | 4.0 |
| 8 | 177850.0 | 538.2 | 39.2 | 14.4 | 4.0 |

TABLE 7

Gateway Capacity Effect on Query Success Rate

| | | Success rate (%) | | | Efficiency | |
|---|---|---|---|---|---|---|
| SSCN | GTW capacity | First attempts | First DS1 | First DS2 | CE | IE |
| 5 | 2-7 | 97.0 | 97.2 | 99.0 | −0.62 | 0.0009 |
| 6 | 3-8 | 97.6 | 97.8 | 99.1 | −0.61 | 0.0009 |
| 7 | 4-9 | 97.2 | 97.4 | 98.9 | −0.59 | 0.0009 |
| 8 | 6-11 | 97.3 | 97.5 | 98.9 | −0.12 | 0.0004 |

It is clear from Table 8 that the results of success rates do not change considerably with variation of the DSL1's capacity. However, as is shown in FIG. 1, DSL1s capacity has a clear impact on the number of attempts that are required for addressing the queries after the initial attempt. FIG. 1 is a graph that shows the distribution of the Queries over the number of attempts for different DSL1s capacities in a simulation. Capacities 1 to 4 are equal to 2-7, 3-8, 4-9 and 6-11 GTWs respectively. After the initial attempt, increase in DSL1s capacity lowers the number queries that are addressed with a few more attempts (e.g. less than 30) and increases the amount of queries that are addressed with higher attempts. This phenomenon implies that the increase in the DSL1s capacity has shifted the source of misdirecting errors of the queries, towards the higher layers of the network.

Indeed in simulations, the number of generated sensors increases with the DSL1s capacity (see Table 7). As was mentioned earlier, the query time of the baseline model, increases with the number of sensors, which in turn has improvement of CE value between SSCN 9 and 10 in Table 7. However, from SSCN 10 to 12 the increase in query routing process overhead, that was explained earlier, degrades the CE parameter.

The next set of simulations analyses the impact of variation of DSL2s capacity over the query processing performance. This includes 4 simulation sets each of which specifies a different value for range of the capacity of the DSL2s, starting from 2-7 DSL1s to 3-8, 4-9 and 6-11 DSL1s. Other components are generated based on their initial specification that was provided at Table 1. Table 8 summarizes the average number of the components that where generated through the simulations. Simulation results are tabulated in Table 10.

Success rate results in Table 10, indicates that the proposed approach is agnostic to the capacity of the DS1s. The reason lies in the fact that the numbers of sensors that are registered at the gateways remain the same in these set of simulations. These observations alongside with results of SSCN 1, which has similar specification but less capacity for DSL2, with the previous argument on the critical role of WSNs density over the performance of the query processing.

20-40 attempts that shows a significant divergence between traces. This divergence can be due to the DSL2s capacity effect, where increasing the number of DS1s has made the query processing to take more attempts to address the queries that were not addressed under the first DS.

The final set of the first category of simulations, explores the effect of the variation of DSL3 capacity over the query processing performance. This includes 4 simulation sets each of which specifies a different value for the capacity of the DSL3 including 2, 3, 5 and 6 DSL2s. Other components are generated based on their initial specification that was provided at Table 1. Table 10 summarizes the average number of the components that where generated through the simulations and results are tabulated in Table 11.

Improvement on CE value with the increase of the number of DSL2s, once again agrees with the previous observations on the effect of total number of sensors and emphasis on scalability of proposed approach. IE value has also remained unchanged at different capacity of DSL3 implying that the number of created Gaussian components tends to increase in proportion with the number of sensors in these scenarios.

TABLE 8

Simulation Environment Summary

| SSCN | Sensors | WSN | GTW | DSL1 | DSL2 |
|---|---|---|---|---|---|
| 13 | 95316.0 | 323.2 | 63.7 | 20.6 | 4.0 |
| 14 | 103220.0 | 490.8 | 68.3 | 22.3 | 4.0 |
| 15 | 116600.0 | 478.7 | 76.4 | 25.3 | 4.0 |
| 16 | 137320.0 | 472.7 | 88.5 | 28.9 | 4.0 |

TABLE 9

DSL2 Capacity Effect on Query Success Rate

| | | Success rate (%) | | | | |
|---|---|---|---|---|---|---|
| SSCN | DSL2 capacity | First attempts | First DS1 | First DS2 | Efficiency CE | IE |
| 13 | 2-7 | 94.3 | 94.3 | 99.0 | −0.91 | 0.0008 |
| 14 | 3-8 | 94.2 | 94.3 | 99.0 | −0.84 | 0.0008 |
| 15 | 4-9 | 94.2 | 94.3 | 99.0 | −0.72 | 0.0007 |
| 16 | 6-11 | 94.2 | 94.3 | 99.0 | −0.61 | 0.0007 |

Another interesting point is the behavior of the IE parameter. With the increase of DS2s capacity more and more gateways are created. The number of gateways is in turn dependent on the number of generated models. Also generating more gateways means more sensors are to be created and referenced. Therefore, IE parameter shows the trade-off between number of sensors and model components at different size of the network.

Improvement on CE value with the increase of DSL2s capacity, complies with the previous arguments on the effect of total number of sensors and emphasis on scalability of proposed approach.

Figure 12:
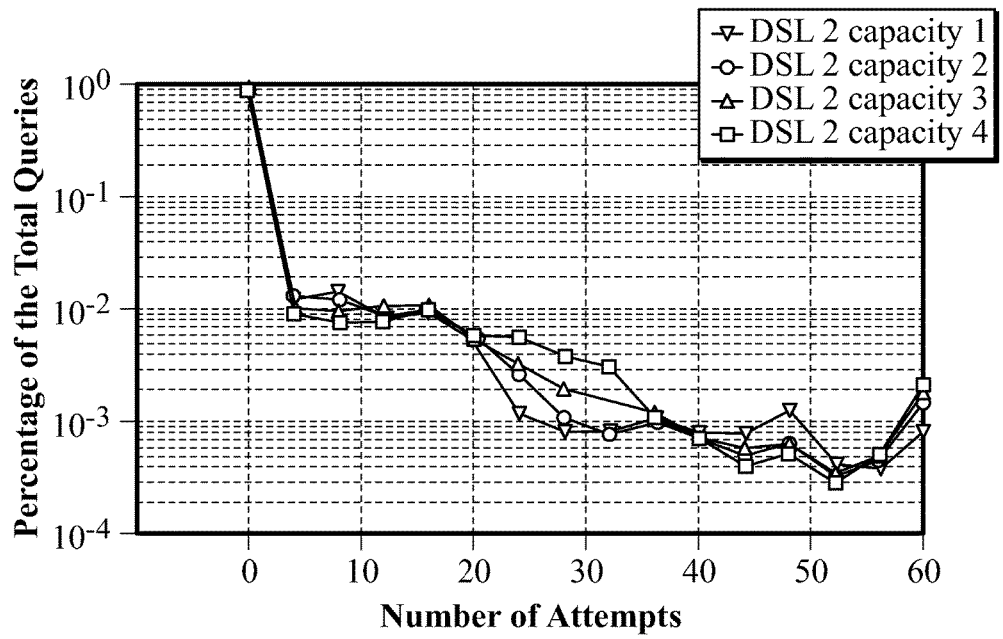
FIG. 12 is a graph that shows the number of attempts required for processing the queries at each capacity range of DSL2s in a simulation.

FIG. 12 is a graph that shows the number of attempts required for processing the queries at each capacity range of DSL2s in a simulation. Capacities 1 to 4 are equal to 2-7, 3-8, 4-9 and 6-11 DSL1s respectively. While the ratio for the initial attempts that are typically made under the first DS1, are similar among different traces, there is a region between

TABLE 10

Simulation Environment Summary

| SSCN | Sensors | WSN | GTW | DSL1 | DSL2 |
|---|---|---|---|---|---|
| 17 | 24187.0 | 87.3 | 16.6 | 6.2 | 2.0 |
| 18 | 41659.0 | 174.1 | 27.9 | 9.3 | 3.0 |
| 19 | 58441.0 | 218.0 | 39.8 | 13.4 | 5.0 |
| 20 | 78920.0 | 361.0 | 53.0 | 18.6 | 6.0 |

TABLE 11

DSL3 Capacity Effect on Query Success Rate

| | | Success rate (%) | | | | |
|---|---|---|---|---|---|---|
| SSCN | DSL3 capacity | First attempts | First DS1 | First DS2 | Efficiency CE | IE |
| 17 | 2 | 92.3 | 92.5 | 98.5 | −3.06 | 0.0018 |
| 18 | 3 | 93.8 | 94.0 | 98.7 | −2.41 | 0.0016 |
| 19 | 5 | 95.2 | 95.4 | 98.5 | −2.19 | 0.0018 |
| 20 | 6 | 94.2 | 94.3 | 98.5 | −1.90 | 0.0018 |

Figure 13:
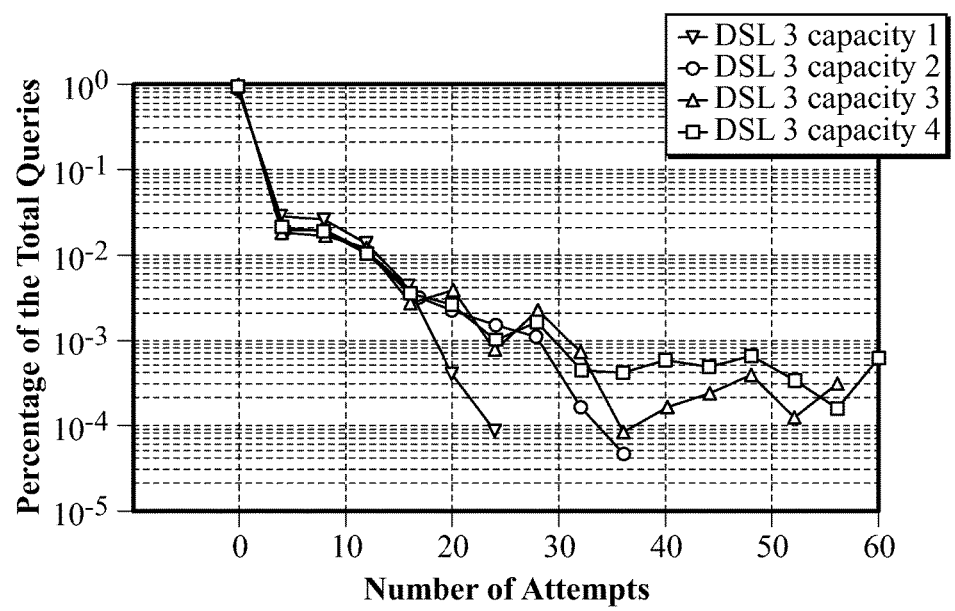
FIG. 13 is a graph that shows the number of attempts required for processing the queries at each capacity range of DSL3s in a simulation.

FIG. 13 is a graph that shows the number of attempts required for processing the queries at each capacity range of DSL3s in a simulation. It can be observed that the order of attempts after the initial phase (between 0-15 attempts) which belongs to the attempts under the first DSL1 increases with the size of the network. Capacities 1 to 4 are equal to 2, 3, 5 and 6 DSL2s respectively.

The last set of simulations is dedicated to the evaluation of the updating mechanism. Through these simulations, once the simulation environment is established and the models are propagated through the network, a number of new sensors are added to the network. Next the references are updated based on the proposed updating mechanisms. The effect of updating mechanisms is then investigated based on the number of attempts that are required to locate the new data points. The simulation environment comprises 2 DSL2s and the rest of network components are following the similar configuration as is provided in Table 1. Also to the simulation environment is reduced to 122 km². FIG. 14 are graphs that show the number of attempts before and after updates when the population of the added sensors is equal to 10, 22, 26, and 34 percent of the original population in a simulation.

Figure 14A:
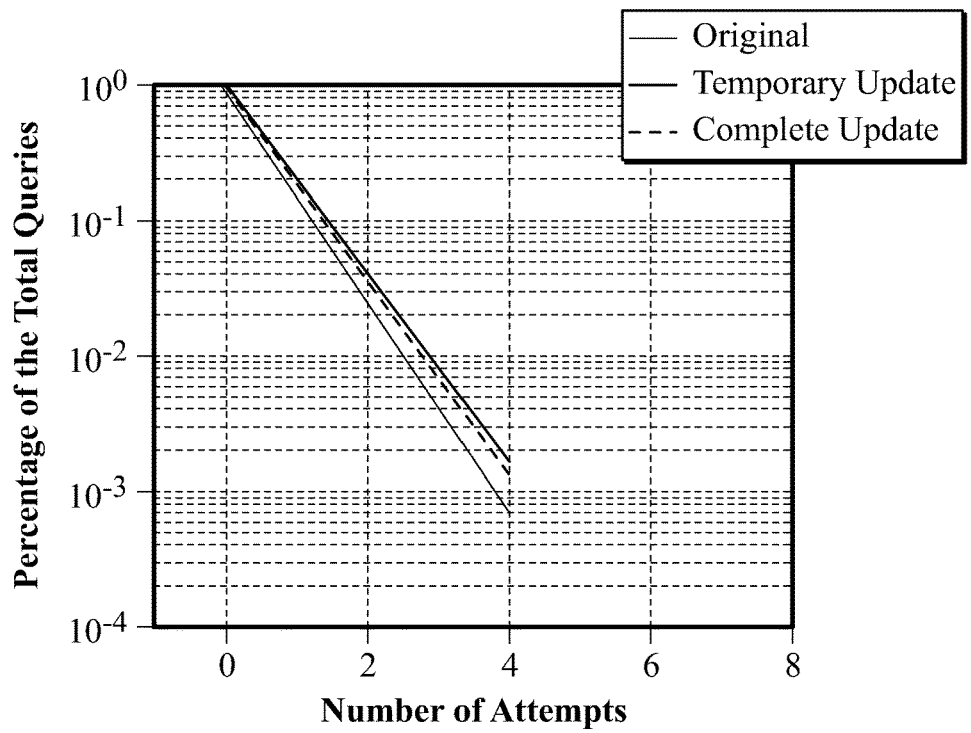
FIG. 14 are graphs that show the number of attempts before and after updates when the population of the added sensors is equal to 10, 22, 26, and 34 percent of the original population in a simulation.
Figure 14B:
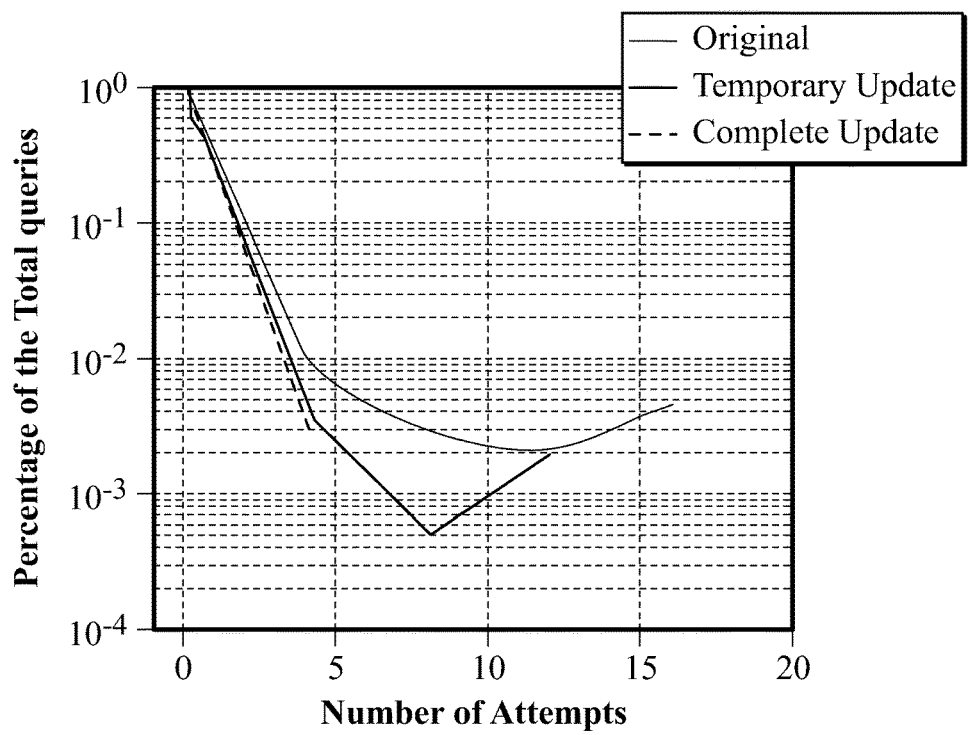
Figure 14C:
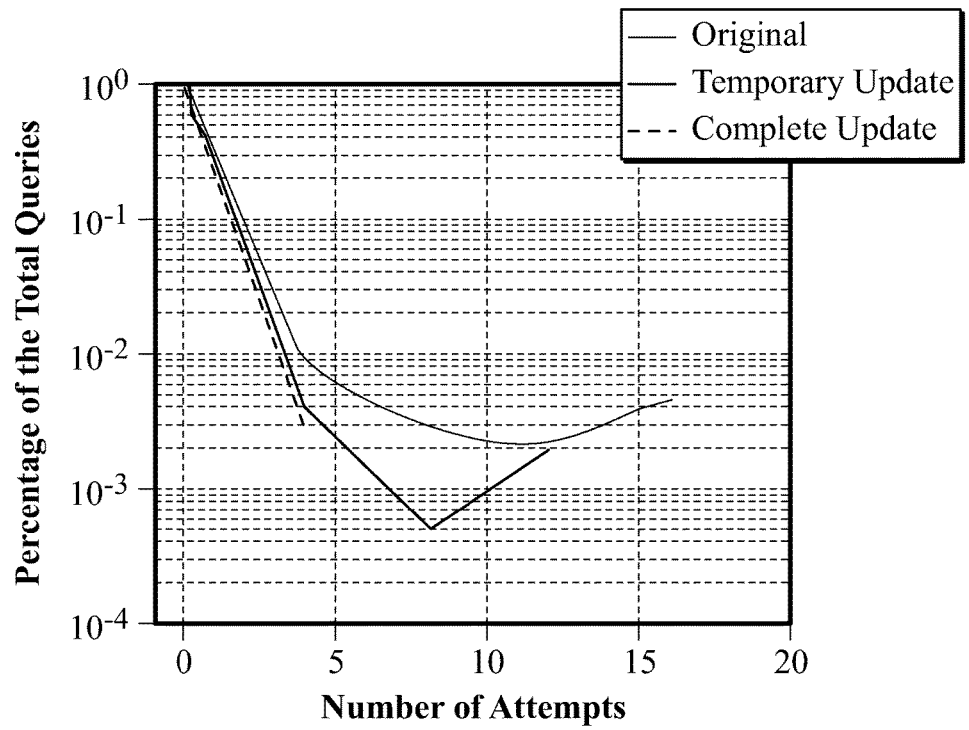
Figure 14D:
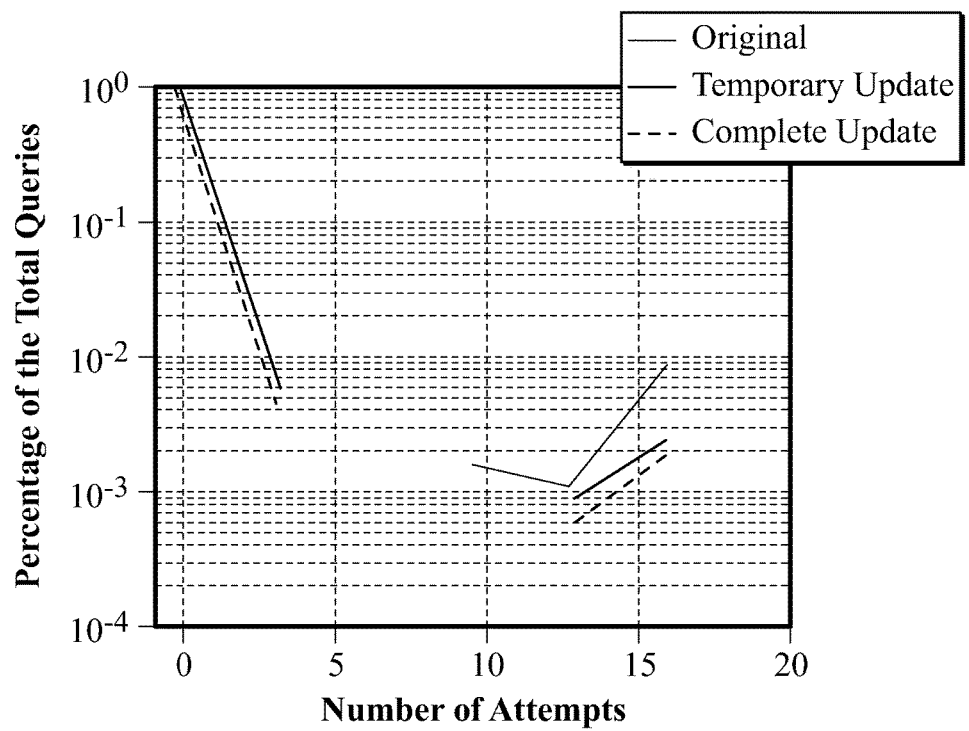

Apart from FIG. 14a, which is corresponding to the situation when population of the added sensors equals to 10 percent of the original population, the other results confirms that the query processing accuracy improves after the updates and the improvements are more significant after of the complete updates. The close performance of the models FIG. 14a indicates that the original model is sufficient for addressing the queries, when the population of the added sensors is negligible with respect to the original population.

Figure 15:
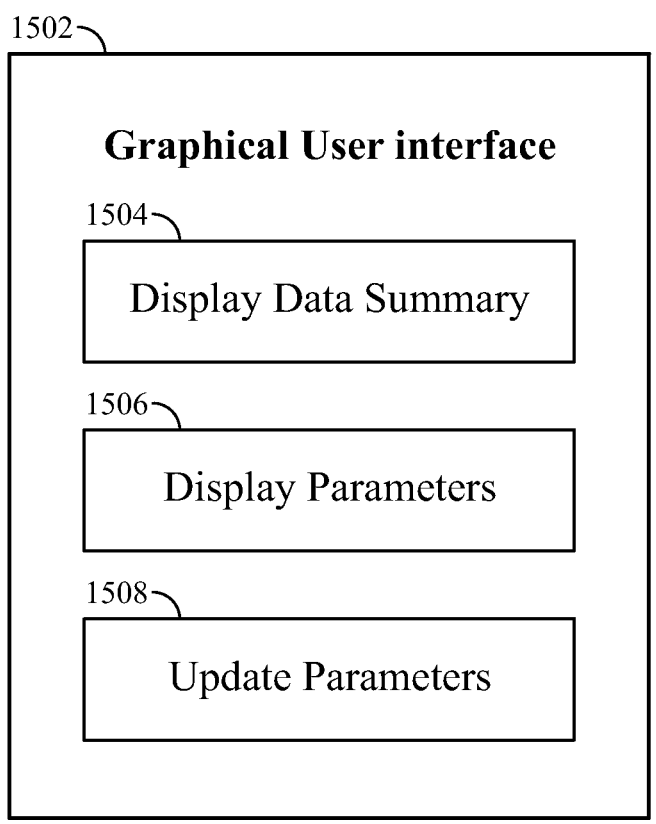
FIG. 15 is a diagram of an exemplary Graphical User Interface (GUI) for use with the system of the present invention.

Interfaces, such as Graphical User Interfaces (GUIs), can be used to assist user to control and/or configure functionalities related to scalable device discovery in an IoT system. FIG. 15 is a diagram that illustrates an interface 1502 that allows a user to get a display of data summary 1504, display parameters 1506 and update parameters 1508. "Parameter" in boxes 1506 and 1508 can refer to parameters related to the probabilistic models for summarizing sensory data and parameters (e.g. the frequency to trigger an update) being used in update process as described above. For example the GUI 1502 can be used to display the parameters such as those shown in FIG. 4. In another example, box 1508 can be used to update the parameters related to probabilistic models and/or the parameters related to the update process as described above. It is to be understood that interface 1502 can be produced using displays such as those shown in FIGS. 16C-D described below.

Example M2M/IoT/WoT Communication System

Figure 16A:
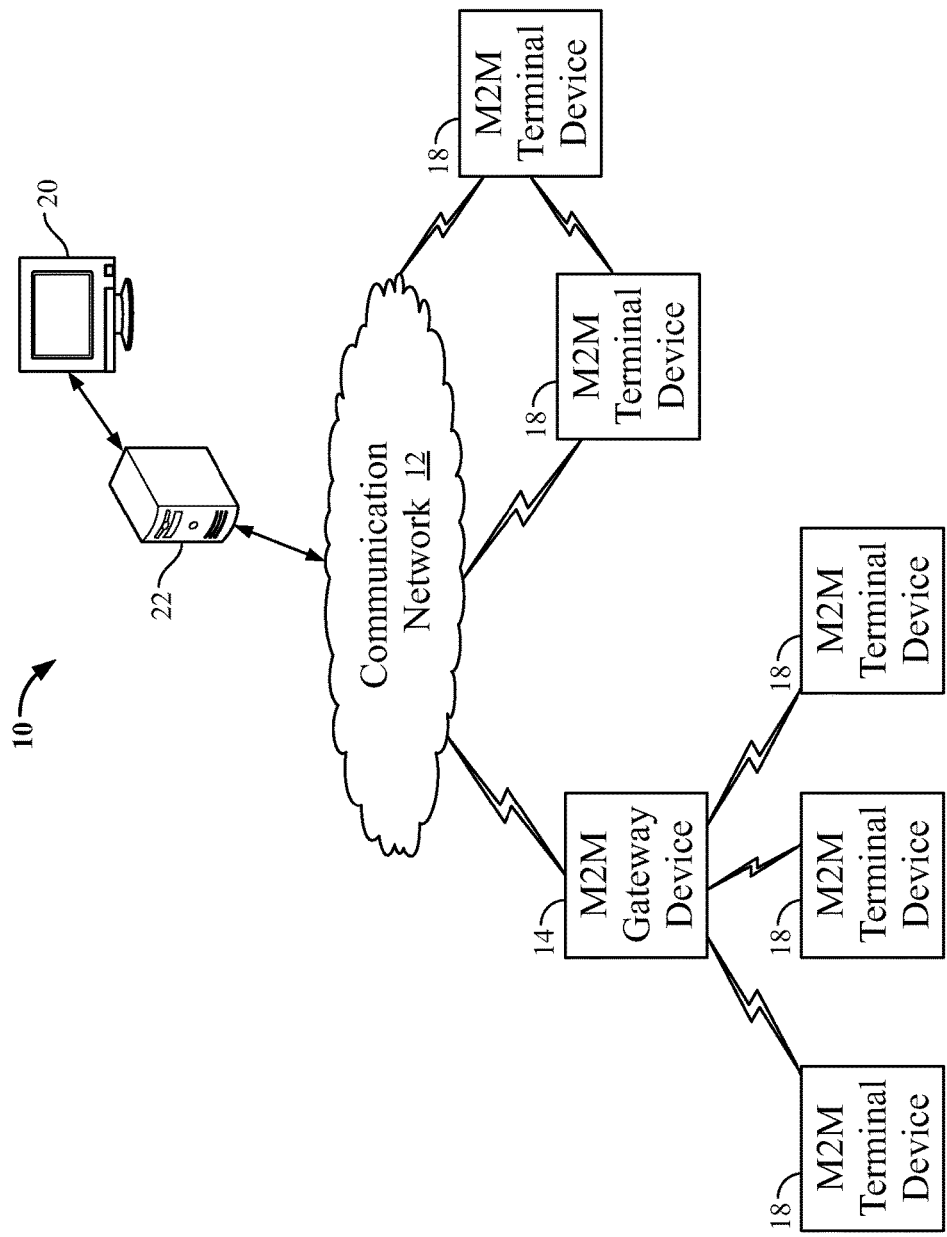
FIG. 16A is a diagram of a M2M/IoT/WoT communication system that includes a communication network.

FIG. 16A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as gateways 306, DSs 106 and 310 and IRs 104 as well as logical entities to produce the user interfaces, such as GUI 1502.

As shown in FIG. 16A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 16A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 16B:
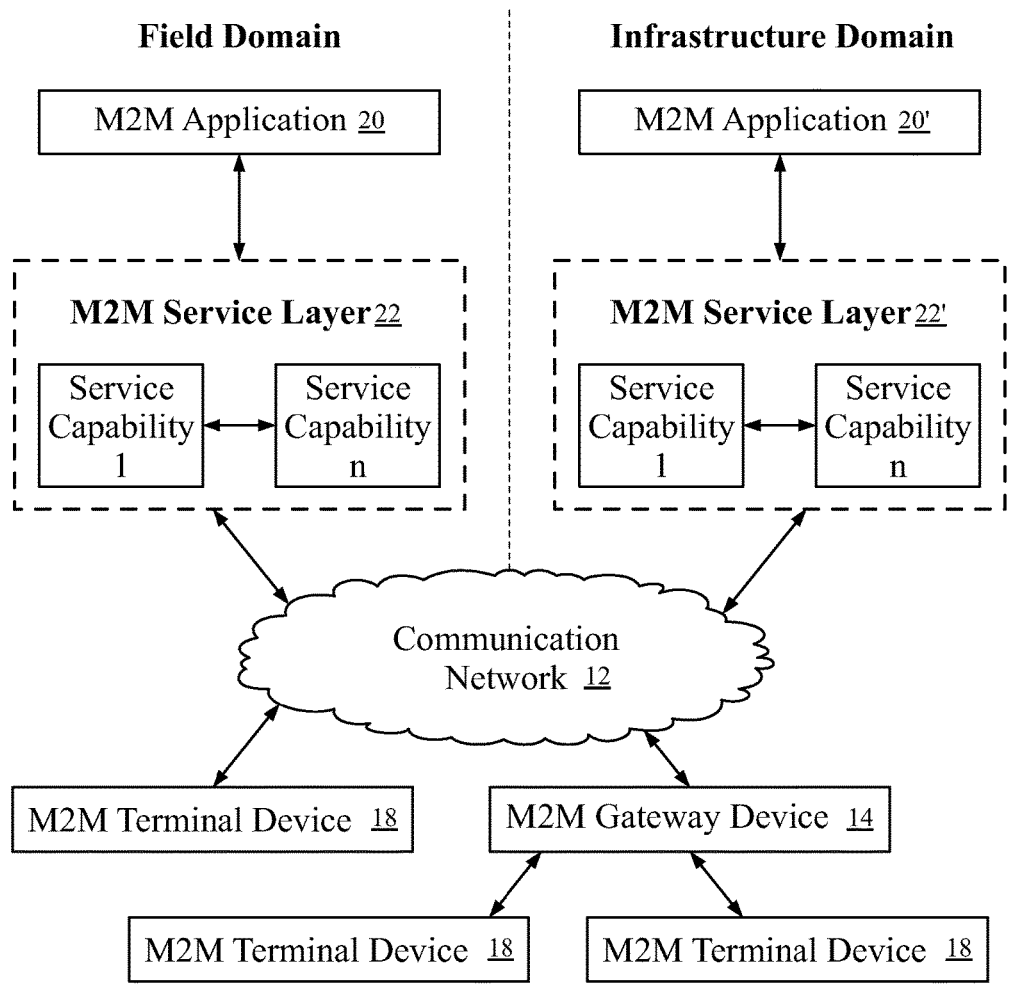
FIG. 16B is a diagram of an illustrated M2M service layer in the field domain that provides services for the M2M application, M2M gateway devices, and M2M terminal devices and the communication network.

Referring to FIG. 16B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as gateways 306, DSs 106 and 310 and IRs 104 as well as logical entities to produce the user interfaces, such as GUI 1502. The M2M service layer 22 may be implemented by one or more servers, computers, devices, virtual machines (e.g. cloud/storage farms, etc.) or the like, including for example the devices illustrated in FIGS. 16C and 16D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 16B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as gateways 306, DSs 106 and 310 and IRs 104 as well as logical entities to produce the user interfaces, such as GUI 1502 may be hosted within a M2M service layer instance hosted by an M2M node, such as an M2M server, M2M gateway, or M2M device, as shown in FIG. 16B. For example, the logical entities such as gateways 306, DSs 106 and 310, DS levels 502, 504 and 506, and IRs 104 as well as logical entities to produce the user interfaces, such as GUI 1502 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 16C or FIG. 16D described below.

Further, logical entities of the present application such as gateways 306, DSs 106 and 310, DS levels 502, 504 and 506, and IRs 104 as well as logical entities to produce the user interfaces, such as GUI 1502 can implemented as part of an M2M network that uses a Service Oriented Architecture (SOA) and/or a Resource-Oriented Architecture (ROA) to access services of the present application.

Figure 16C:
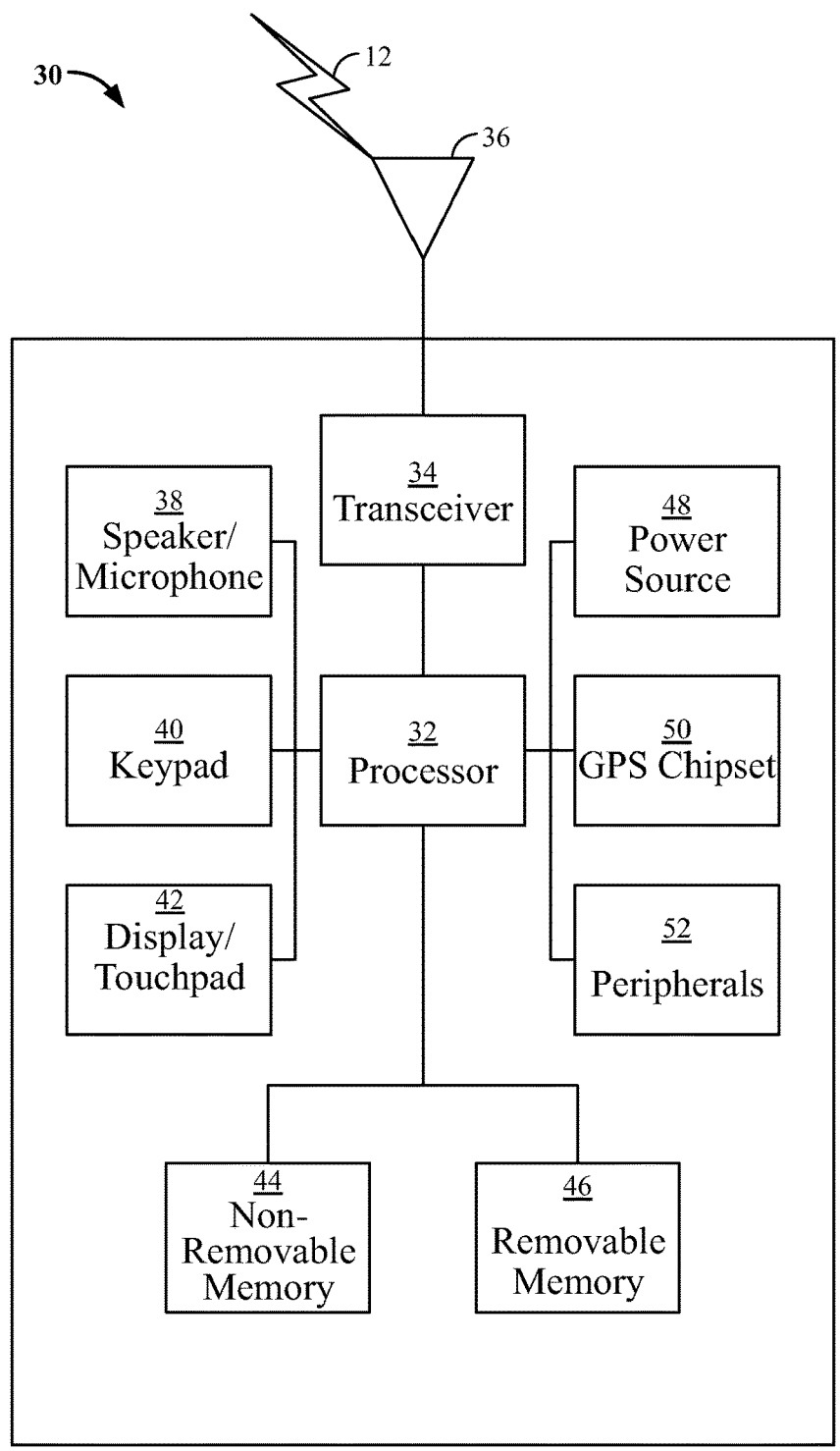
FIG. 16C is a diagram of an example end node such as an UE or other end node device.

FIG. 16C is a block diagram of an example hardware/software architecture of a M2M network node 30, such as an M2M device 18, an M2M gateway 14, an M2M server, or the like. The node 30 can execute or include logical entities such as gateways 306, DSs 106 and 310, DS levels 502, 504 and 506, and IRs 104 as well as logical entities to produce the user interfaces, such as GUI 1502. The device 30 can be part of an M2M network as shown in FIG. 16A-B or part of a non-M2M network. As shown in FIG. 16C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 16C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 16C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 16C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 16D:
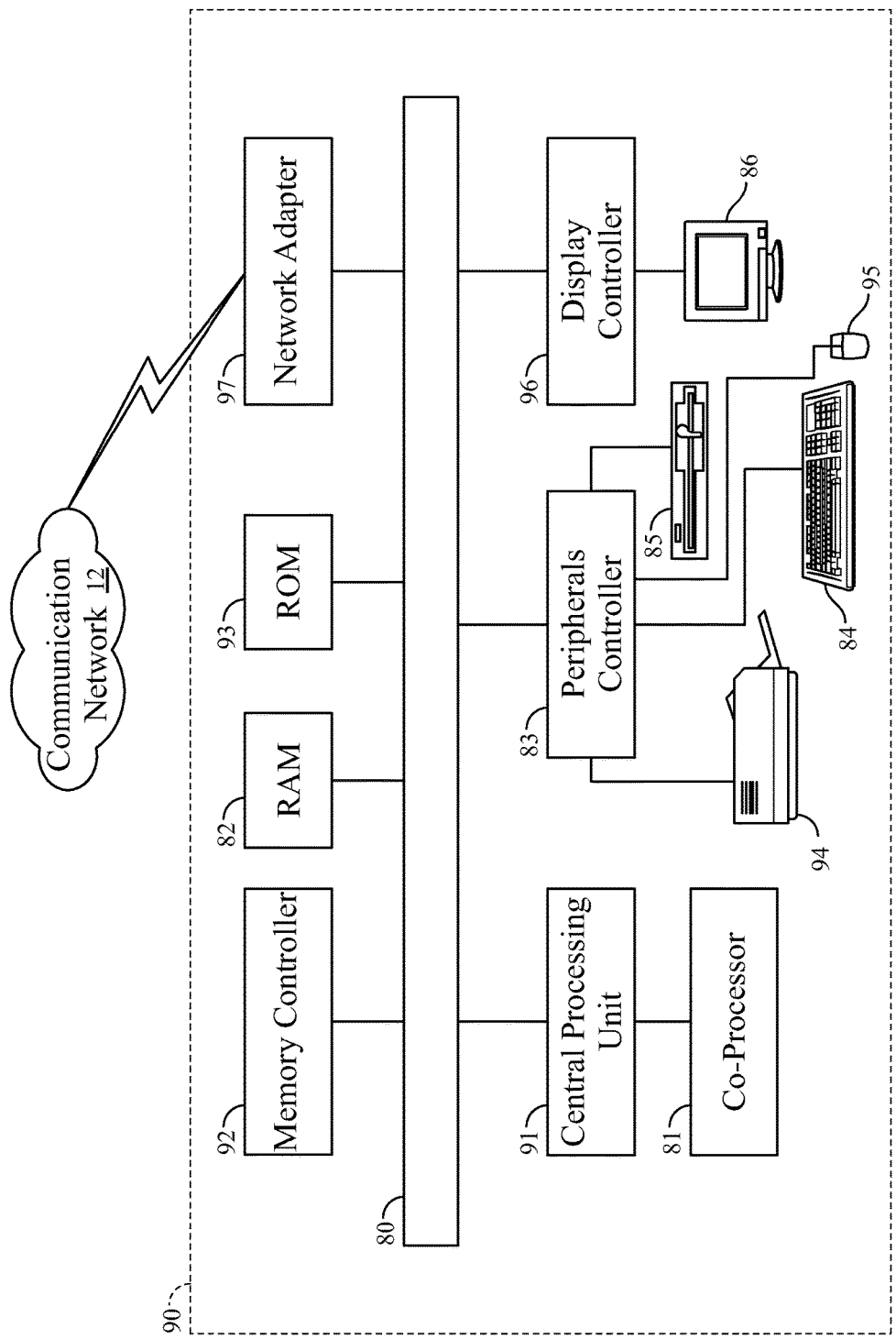
FIG. 16D is a block diagram of a computer system or server that may be used to implement any of the network nodes described herein.

FIG. 16D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as gateways 306, DSs 106 and 310, DS levels 502, 504 and 506, and IRs 104, as well as logical entities to produce the user interfaces, such as GUI 1502. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 16A and FIG. 16B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as gateways 306, DSs 106 and 310, DS levels 502, 504 and 506, and IRs 104 as well as logical entities to produce the user interfaces, such as GUI 1502 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. In a communications network connected to at least one group of sensors, a method comprising:
   storing, at a gateway of a plurality of gateways of the communications network, sensor data from the at least one group of sensors in the communications network;
   generating, at the gateway of the communications network, a probabilistic model comprising one or more parameters which describe one or more attributes of the sensor data; and
   sending, to a discovery server of the communications network, the one or more parameters of the probabilistic model for use in data discovery,
   wherein the discovery server, upon receiving a request for sensor data, is configured to determine, based on the one or more parameters of the probabilistic model, a probability that one or more of the gateways of the communications network has the sensor data stored thereon.

2. The method of claim 1, wherein the probabilistic model is a mixture model.

3. The method of claim 2, wherein the probabilistic model is a Gaussian Mixing Model (GMM).

4. The method of claim 3, wherein Gaussian Mixing Model is constructed using an Expectation Maximization (EM) algorithm.

5. The method of claim 1, wherein the discovery server is part of a hierarchical arrangement of discovery servers.

6. The method of claim 1, wherein the at least one group of sensors are connected to the gateway.

7. The method of claim 6, wherein the discovery server is connected to additional gateways and the discovery server produces a second probabilistic model using the parameters from the gateway and parameters from additional gateways.

8. The method of claim 1, wherein the parameters are updated using a short term update and a full parameter update, and wherein the short term update is computationally less intensive than the full parameter update.

9. The method of claim 1, wherein the communications network comprises or is part of an Internet of Things (IoT) system.

10. A gateway of a plurality of gateways in a communications network, the gateway comprising a processor and a memory, the memory storing computer-executable instructions which, when executed by the processor of the gateway, cause the gateway to:
   store, at the gateway, sensor data from at least one group of sensors in the communications network;
   generate, at the gateway of the communications network, a probabilistic model comprising one or more parameters which describe one or more attributes of the sensor data; and
   send, to a discovery server of the communications network, the one or more parameters of the probabilistic model for use in data discovery,
   wherein the discovery server, upon receiving a request for sensor data, is configured to determine, based on the one or more parameters of the probabilistic model, a probability that one or more of the gateways of the communications network has the sensor data stored thereon.

11. The gateway of claim 10, wherein the probabilistic model is a mixture model.

12. The gateway of claim 11, wherein the probabilistic model is a Gaussian Mixing Model (GMM).

13. The gateway of claim 12, wherein Gaussian Mixing Model is constructed using an Expectation Maximization (EM) algorithm.

14. The gateway of claim 10, wherein the discovery server is part of a hierarchical arrangement of discovery servers.

15. The gateway of claim 10, wherein the at least one group of sensors are connected to the gateway.

16. The gateway of claim 15, wherein the discovery server is connected to additional gateways and the discovery server produces a second probabilistic model using the parameters from the gateway and parameters from additional gateways.

17. The gateway of claim 10, wherein the parameters are updated using a short term update and a full parameter update, and wherein the short term update is computationally less intensive than the full parameter update.

18. The gateway of claim 10, wherein the communications network comprises or is part of an Internet of Things (IoT) system.

* * * * *